(12) United States Patent
Dwyer et al.

(10) Patent No.: US 8,238,267 B2
(45) Date of Patent: Aug. 7, 2012

(54) VOICE SERVICE IN EVOLVED PACKET SYSTEM

(75) Inventors: Johanna Lisa Dwyer, Ottawa (CA);
Richard Charles Burbidge, Hook (GB);
Stefano Faccin, Hayward, CA (US);
Chen Ho Chin, Deerlijk (BE)

(73) Assignee: Research In Motion Limited, Waterloo (CA)

( * ) Notice: Subject to any disclaimer, the term of this patent is extended or adjusted under 35 U.S.C. 154(b) by 0 days.

(21) Appl. No.: 13/244,721

(22) Filed: Sep. 26, 2011

(65) Prior Publication Data

US 2012/0014354 A1 Jan. 19, 2012

Related U.S. Application Data

(63) Continuation of application No. 12/793,673, filed on Jun. 3, 2010.

(60) Provisional application No. 61/183,937, filed on Jun. 3, 2009.

(51) Int. Cl.
*H04L 12/28* (2006.01)
*H04L 12/66* (2006.01)
*H04W 4/00* (2009.01)

(52) U.S. Cl. ...... 370/254; 370/352; 370/401; 455/435.2

(58) Field of Classification Search .................. None
See application file for complete search history.

(56) References Cited

U.S. PATENT DOCUMENTS

| | | | | |
|---|---|---|---|---|
| 5,353,332 A * | 10/1994 | Raith et al. | .................. | 455/455 |
| 7,904,055 B2 * | 3/2011 | Lee et al. | .................... | 455/411 |
| 2003/0105864 A1 * | 6/2003 | Mulligan et al. | ............... | 709/225 |
| 2004/0184452 A1 | 9/2004 | Huotari et al. | | |
| 2004/0266435 A1 | 12/2004 | de Jong et al. | | |
| 2007/0064709 A1 | 3/2007 | Holmstrom et al. | | |
| 2007/0130465 A1 * | 6/2007 | Zeng et al. | .................... | 713/171 |
| 2007/0174443 A1 * | 7/2007 | Shaheen et al. | ............... | 709/223 |
| 2007/0206620 A1 | 9/2007 | Cortes et al. | | |
| 2008/0102896 A1 * | 5/2008 | Wang et al. | .................... | 455/560 |
| 2008/0188247 A1 * | 8/2008 | Worrall | ......................... | 455/458 |
| 2008/0220782 A1 * | 9/2008 | Wang et al. | ................... | 455/436 |
| 2008/0305825 A1 | 12/2008 | Shaheen | | |
| 2009/0036131 A1 * | 2/2009 | Diachina et al. | .............. | 455/436 |
| 2009/0111423 A1 | 4/2009 | Somasundaram et al. | | |
| 2009/0238117 A1 * | 9/2009 | Somasundaram et al. | .... | 370/328 |
| 2009/0238143 A1 * | 9/2009 | Mukherjee et al. | ........... | 370/331 |
| 2009/0239584 A1 * | 9/2009 | Jheng et al. | .................... | 455/558 |
| 2009/0280814 A1 * | 11/2009 | Farnsworth | .................... | 455/436 |

(Continued)

OTHER PUBLICATIONS

U.S. Appl. No. 61/160,206, filed Mar. 13, 2009, Tenny et al.*

(Continued)

*Primary Examiner* — Gregory Sefcheck
(74) *Attorney, Agent, or Firm* — Hanley, Flight & Zimmerman, LLC.

(57) ABSTRACT

Methods and apparatus to manage voice service in evolved packet systems are disclosed. An example method in a UE in an Evolved Packet System (EPS) includes receiving a first Non Access Stratum (NAS) protocol response message with network provided Voice over IP Multimedia (IM) Core Network (CN) Subsystem (VoIMS) indicators, wherein the UE has a voice services indicator related to a UE usage setting and responsive to at least one of the voice services indicator related to a UE usage setting or the network provided VoIMS indicators, causing the UE to disable evolved universal mobile telecommunications system terrestrial radio access (E-UTRAN) cell reselection.

24 Claims, 26 Drawing Sheets

U.S. PATENT DOCUMENTS

| | | | |
|---|---|---|---|
| 2009/0285157 | A1 | 11/2009 | Yeoum et al. |
| 2010/0048168 | A1* | 2/2010 | Fox .............................. 455/410 |
| 2010/0075651 | A1 | 3/2010 | Hallenstal et al. |
| 2010/0075670 | A1* | 3/2010 | Wu .............................. 455/434 |
| 2010/0093350 | A1* | 4/2010 | Wang et al. .................. 455/436 |
| 2010/0098023 | A1 | 4/2010 | Aghili et al. |
| 2010/0099402 | A1* | 4/2010 | Wu .............................. 455/423 |
| 2010/0120455 | A1 | 5/2010 | Aghili et al. |
| 2010/0130218 | A1* | 5/2010 | Zhang et al. .................. 455/450 |
| 2010/0182971 | A1 | 7/2010 | Chin |
| 2010/0234026 | A1* | 9/2010 | Tenny et al. .................. 455/436 |
| 2010/0260105 | A1 | 10/2010 | Keller et al. |
| 2010/0265847 | A1* | 10/2010 | Lee et al. ....................... 370/254 |
| 2010/0265884 | A1 | 10/2010 | Vikberg et al. |
| 2010/0278146 | A1* | 11/2010 | Aoyama et al. ............... 370/331 |
| 2010/0279648 | A1 | 11/2010 | Song et al. |
| 2010/0297979 | A1* | 11/2010 | Watfa et al. ................. 455/404.1 |
| 2010/0329244 | A1* | 12/2010 | Buckley et al. ............... 370/352 |
| 2011/0002267 | A1* | 1/2011 | Dwyer et al. .................. 370/328 |
| 2011/0002268 | A1* | 1/2011 | Dwyer et al. .................. 370/328 |
| 2011/0002327 | A1* | 1/2011 | Dwyer et al. .................. 370/352 |
| 2011/0171924 | A1* | 7/2011 | Faccin et al. ................ 455/404.1 |
| 2011/0171925 | A1* | 7/2011 | Faccin et al. ................ 455/404.1 |
| 2011/0171926 | A1* | 7/2011 | Faccin et al. ................ 455/404.1 |
| 2011/0274090 | A1 | 11/2011 | Hallensal et al. |
| 2011/0305192 | A1* | 12/2011 | Faccin et al. .................. 370/328 |

OTHER PUBLICATIONS

3rd Generation Partnership Project; Technical Specification Group Core Network and Terminals; IP multimedia call control protocol based on Session Initiation Protocol (SIP) and Session Description Protocol (SDP); Stage 3 (Release 8); 3GPP Standard; 3GPP TS 24.229, V8.7.0, Mar. 2009, 618 pages.
International Searching Authority, Communication Relating to the Results of the Partial International Search, Issued in connectin with PCT/US2010/037340, mailed on Oct. 29, 2010, 2 pages.
CT1: "Response LS on CS domain and IM CN subsystem selection principles" 3GPP DRAFT; C1-092262, 3rd Generation Partnership Project (3GPP), Mobile Competence Centre; 650, Route Des Lucioles; F-06921 Sophia-Antipolis Cedexl Grance, no. Sophia Antipolis (France); Apr. 27, 2009, pp. 1-5.
NTT Docomo et al: CS/PS mode of operation 3GPP Draft; R2-093270 CS-PS Mode, 3rd Generation Paternship Project (3GPP), Mobile Competence Centre; 650, Route Des Lucioles; F-06921 Sophia-Antipolis Cedex; France, no. San Francisco, USA; Apr. 28, 2009, pp. 1-4.
Ericsson: "CS domain and IM CN Subsystem selection principals" 3GPP DRAFT; S2-096178_CR-23221-Domain-Selectionr_REV4, 3rd Generation Partnership Project (3GPP), Mobile Competence Centre; 650, Route Des Lucioles; F-06921 Sophia-Antipolis Cedex; France, vol. TSG Geran, no. Vancouver; 20090831, May 11, 2009, pp. 1-9.
T-Mobile: "Voice mode selection for CSS Fallback and IMS" May 11, 2009, pp. 1-6, XP002604555 3GPP TSG SA WG2 Meeting 73, Tallinn, Estonia Retrieved from the Internet: URL: http://www.3gpp.com/ftp/tsg_sa/WG2_Arch/TSGS2_73_Tallinn/docs/S2-093814.zip, pp. 1-6.
NEC: Discussion on CS/PS modes of operation and interactions with AS Apr. 27, 2009, 3GPP DRAFT; C1-091801, 3rd Generation Partnership Project (3GPP) Mobile Competence Centre; 650, Route Des Lucioles; F-006921 Sophia-Antipolis Cedex; France, pp. 1-3.
Nokia Siemens Networks et al: "Handling of CS/PS Mode of Selection" 3GPP DRAFT; R2-092998 (CSFB Mode), 3rd Generation Partnership Project (3GPP), Mobile Competence Centre; 650, Route Des Lucioles; F-06921 Sophia-Antipolis Cedex; France, no. San Francisco, USA; Apr. 28, 2009, pp. 1-6.
3rd Generation Partnership Project; Technical Specification Group Core Network and Terminals; Mobile radio interface Layer 3 specification; Core network protocols; Stage 3 (Release 8); 3GPP Standard; 3GPP TS 24.008, Valbonne, France, V8.5.0, Mar. 2009, 581 pages.
3rd Generation Partnership Project; Technical Specification Group Radio Access Network; User Equipment (UE) procedures in idle mode and procedures for cell reselection in connected mode (Release 9); 3GPP Standard; 3GPP TS 25.304, Valbonne, France, V8.5.0, Mar. 2009, 48 pages.
3rd Generation Partnership Project; Technical Specification Group Radio Access Network; Evolved Universal Terrestrial Radio Access (E-UTRA) Radio Resource Control (RRC); Protocol specification (Release 8); 3GPP Standard; 3GPP TS 36.331, Valbonne, France, V8.5.0, Mar. 2009, 204 pages.
3rd Generation Partnership Project; Technical Specification Group Radio Access Network; Evolved Universal Terrestrial Radio Access (E-UTRA); User Equipment (UE) procedures in idle mode (Release 8); 3GPP Standard; 3GPP TS 36.304, Valbonne, France, V8.5.0, Mar. 2009, 30 pages.
3rd Generation Partnership Project; Technical Specification Group Radio Access Network; Radio Resource Control (RRC); Protocol Specification (Release 8); 3GPP Standard; 3GPP TS 25.331, Valbonne, France, V8.6.0, Mar. 2009, 1673 pages.
3rd Generation Partnership Project; Technical Specification Group Core Network and Terminals; Non-Access-Statum (NAS) protocol for Evolved Packet System (EPS); Stage 3 (Release 8); 3GPP Standard; 3GPP TS 24.301, Valbonne, France, V8.1.0, Mar. 2009, 250 Pages.
Ericsson; "CS domain and IM CN Subsystem selection principals" 3GPP DRAFT; S2-094178-CR-23221-DOMAINSELECTIONR_ 3GPP Mobile Competence Centre; 650, Route Des Lucioles, F-06921 Sophia-Antipolis Cedex; France, vol. TSG GERAN, no. Tallinn, Estonia; 20090831, May 11, 2009, 10 pages.
United States Patent and Trademark Office, Non-Final Office Action, issued for U.S. Appl. No. 13/244,728, on Dec. 8, 2011, 10 pages.
United States Patent and Trademark Office, Non-Final Office Action, issued for U.S. Appl. No. 13/244,744, on Dec. 9, 2011, 8 pages.
International Bureau, International Preliminary Report on Patentability, issued for patent application serial No. PCT/US2010/037336, mailed on Dec. 15, 2011, 8 pages
International Bureau, International Preliminary Report on Patentability, issued for patent application serial No. PCT/US2010/037337, mailed on Dec. 15, 2011, 7 pages.
International Bureau, International Preliminary Report on Patentability, issued for patent application serial No. PCT/US2010/037339, mailed on Dec. 15, 2011, 7 pages.
International Bureau, International Preliminary Report on Patentability, issued for patent application serial No. PCT/US2010/037340, mailed on Dec. 15, 2011, 10 pages.
T-Mobile: "Voice mode selection for CS Fallback and IMS" May 11, 2009; XP-002604555 3GPP TSG SA WG2 Meeting 73, Tallinn, Estonia, Retrieved from the Internet URL: http://www.3gpp.com/ftp/tsg_sa/WG2_Arch/TSGS2_73_Tallin/docs/S2-093814.zip, 6 pages.
CT1: "Response LS on CS domain and IM CN subsystem selection principles" Apr. 27, 2009; 3GPP DRAFT, C1-092262, 3GPP Mobile Competence Centre; 650, Route Des Lucioles; F-06921 Sophia-Antipolis Cedex; France, XP050337399, 5 pages.
NEC: "Discussion on CS/PS modes of operation and interactions with AS" Apr. 27, 2009, 3GPP DRAFT; C1-091801, 3GPP Mobile Competence Centre; 650, Route Des Lucioles; F-06921 Sophia-Antipolis Cedex; France, XP050337399, 4 pages.
Nokia Siemens Networks et al: "Handling of CS/PS Mode Selection" 3GPP DRAFT; R2-092998 (CSFB Mode), 3GPP Mobile Competence Centre; 650, Route Des Lucioles; F-06921 Sophia-Antipolis Cedex; France, no. San Francisco, USA; Apr. 28, 2009, 6 pages.
NTT Docomo et al: "CS/PS mode of operation" 3GPP DRAFT; R2-093270 CS-PS Mode, 3GPP, Mobile Competence Centre; 650, Route Des Lucioles, F-06921 Sophia-Antipolis Cedex; France, no. San Francisco, USA; Apr. 28, 2009, 4 pages.
United States Patent and Trademark Office, Non-Final Office Action, issued for U.S. Appl. No. 12/793,670, on Nov. 30, 2011, 15 pages.
United States Patent and Trademark Office, "Final Office Action," for U.S. Appl. No. 12/793,670, issued on May 22, 2012, 21 pages.
United States Patent and Trademark Office, "Final Office Action," for U.S. Appl. No. 13/244,744, issued on May 24, 2012, 12 pages.
The United States Patent and Trademark Office, Final Rejection, for U.S. Appl. No. 13/244,728, issued on May 29, 2012, 16 pages.
The United States Patent and Trademark Office, Non-Final Rejection, for U.S. Appl. No. 12/793,668, issued on May 29, 2012, 29 pages.

* cited by examiner

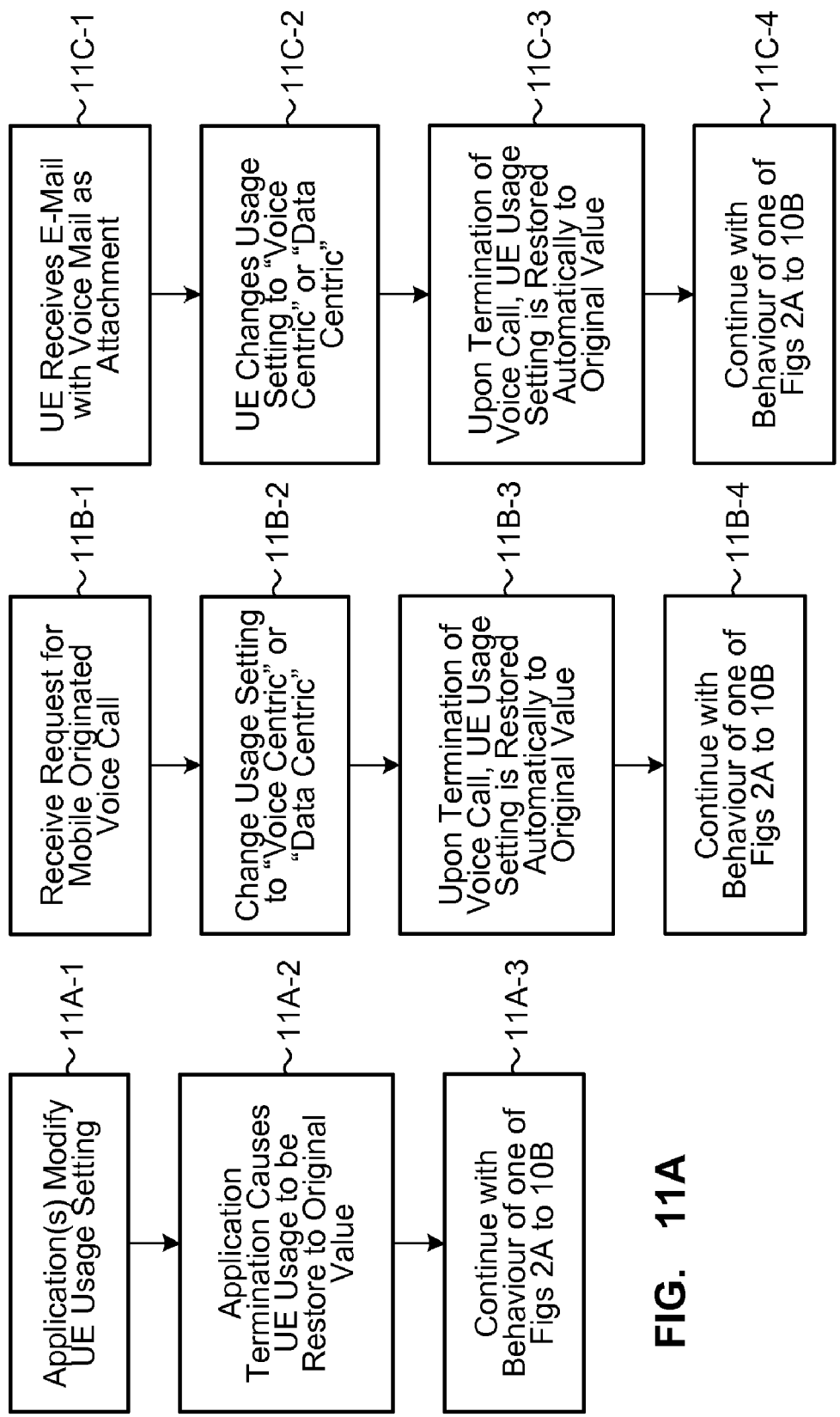

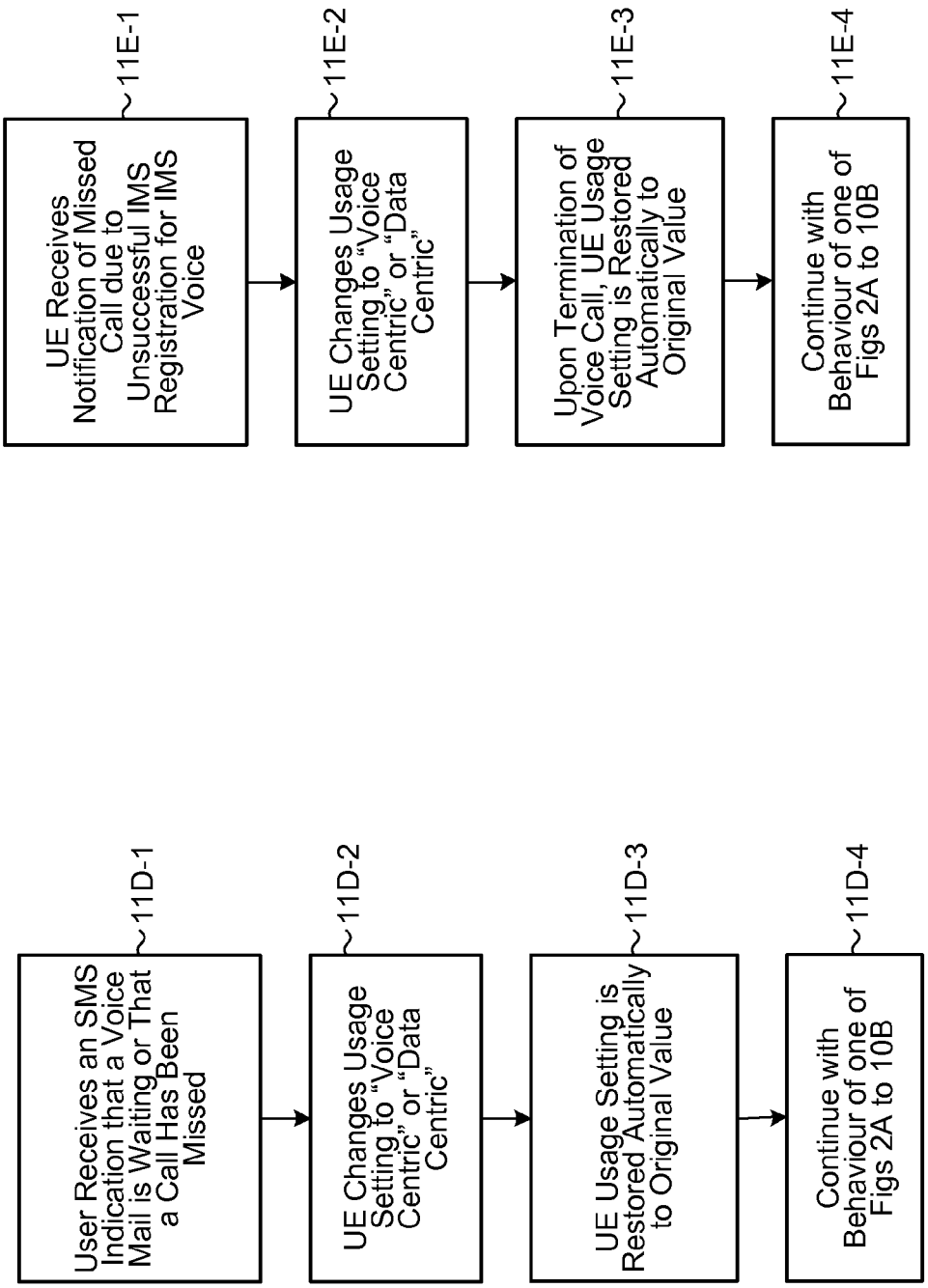

VOICE SERVICE IN EVOLVED PACKET SYSTEM

RELATED APPLICATIONS

This patent is a continuation of U.S. patent application Ser. No. 12/793,673, filed Jun. 3, 2010, entitled Voice Service in Evolved Packet System, which is a non-provisional of U.S. Provisional Application Ser. No. 61/183,937, filed Jun. 3, 2009, entitled "Voice Service in Evolved Packet System Using IP Multimedia Subsystem." U.S. patent application Ser. No. 12/793,673 and U.S. Provisional Application Ser. No. 61/183,937 are hereby incorporated by reference in their entirety.

FIELD OF THE DISCLOSURE

The application relates generally to mobile communication system and, more particularly, to the provision of voice services in Evolved Packet System.

BACKGROUND

Recently, Voice Service Indicators have been defined in evolved packet system (EPS) mobile communication systems to coordinate the availability of network services and capabilities of mobile devices. The voice service indicators include, for example:
  "IMS Voice over PS session supported" indication;
  "Voice Centric" or "Data Centric" indication; and
  "CS Voice only" or "IMS PS voice only" or "CS voice preferred, IMS voice secondary" or "IMS voice preferred, CS voice secondary" indication.

The "IMS Voice over PS session Supported" indication is provided by the network to the user equipment (UE) (given in non access stratum (NAS) registration (e.g. EPS attach) or NAS registration update). The "Voice Centric" or Data Centric" indication and the "CS Voice Only," "IMS PS voice only," "CS voice preferred, IMS voice secondary," or "IMS Voice preferred, CS voice secondary" indication is available on the UE. An operator can configure the "CS Voice Only," "IMS PS voice only," "CS voice preferred, IMS voice secondary," or "IMS Voice preferred, CS voice secondary" indication on the UE.

BRIEF DESCRIPTION OF THE DRAWINGS

For a better understanding of the various implementations described herein and to show more clearly how they may be carried into effect, reference will now be made, by way of example only, to the accompanying drawings which show at least one example implementation and in which:
FIGS. 1A, 1B, 2A, 2B, 3A, 3B, 4A, 4B, 5A, 5B, 6A, 6B, 7A, 7B, 7C, 7D, 8A, 8B, 9A, 9B, 10A, 10B, 10C, 11A, 11B, 11C, 11D, and 11E are flowcharts illustrating example operation of a UE described herein.

DETAILED DESCRIPTION

Figure 1A:
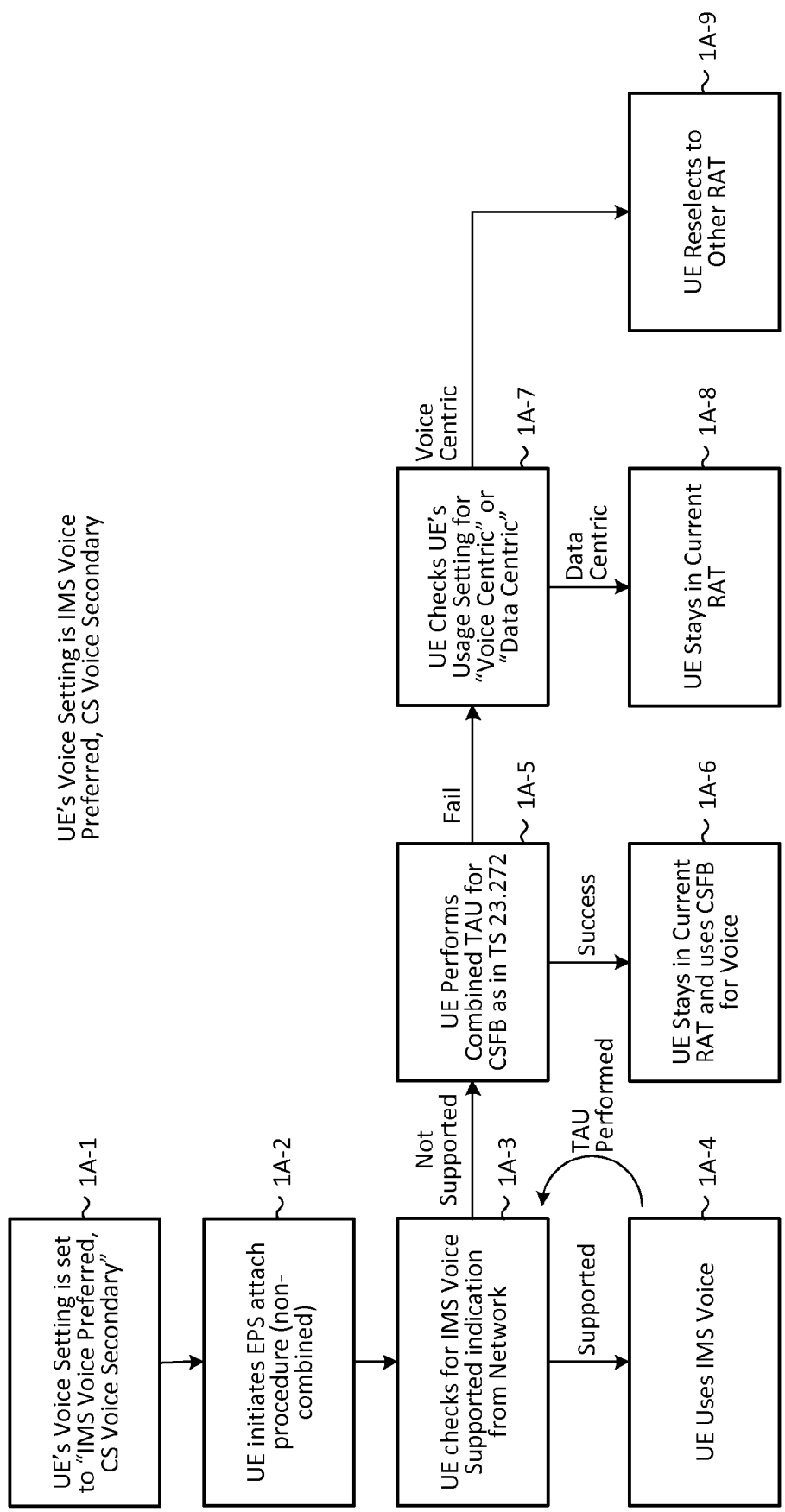

Abbreviations and Terminology
AS Access Stratum
CN Core Network
CS Circuit Switched
CSFB CS Fallback
EMM Evolved Packet System (EPS) Mobility Management
eNB eNodeB
EPC Evolved Packet Core
EPS Evolved Packet System
E-UTRAN Evolved UTRAN
IMS IP Multimedia Subsystem
IM CN IP Multimedia Core Network
MAC Medium Access Control
MS Mobile Station
NAS Non Access Stratum
NW Network
PS Packet Switched
RA Routing Area
PDCP Packet Data Convergence Protocol
RAN Radio Access Network
RAU Routing Area Update
RB Radio Bearer
RLC Radio Link Control
RRC Radio Resource Control
TA Tracking Area
TAI TA Identity
TAU Tracking Area Update
TS Technical Specification
UE User Equipment
UMTS Universal Mobile Telecommunications System
UTRAN UMTS Terrestrial RAN
VoIMS Voice over IMS In example implementation described herein, the voice service indicators may be Network provided VoIMS indicators, UE usage settings, and User Equipment voice settings. In the following description, voice service indicators are referred to as:
  a) (Network provided) (IMS) VoIMS indicator indicating the above referenced "IMS Voice over PS session supported" indication or above referenced "IMS Voice over PS session not supported" indication, and indicates if voice over PS sessions controlled and managed by the IP multimedia subsystem is or is not supported;
  b) UE's usage setting indicating the above-referenced "Voice Centric" or "Data Centric". The UE usage setting is a UE setting that indicates whether the UE has a preference for voice services over data services or vice-versa. If UE has preference for voice services, then the UE's usage setting is "Voice Centric". If a UE has a preference for data services, then the UE's usage setting is "Data Centric". For avoidance of doubt a UE that is "Data Centric" may still require voice services. If a UE requires only data services and can accept that there is no voice service, the UE's usage setting is "Data Only." The two settings may have the following meanings:
    "Voice Centric": a Voice Centric UE must be able to use voice services, and therefore will attempt to obtain voice services independently of how such services can be provisioned
    "Data Centric": a Data Centric UE prefers to have the best possible PS services even if this implies no access to voice services is possible
  A further UE's usage setting of "Data Only" is possible. In the case that this additional setting is possible then the three settings may have the following meanings:
    "Voice Centric": a Voice Centric UE must be able to use voice services, and therefore will attempt to obtain voice services independently of how such services can be provisioned
    "Data Centric": a Data Centric UE prefers to have the best possible PS services (i.e. prefers to stay in E-UTRAN) provided that access to voice service is not excluded "Data Only": a Data Centric UE prefers to have the best possible PS services even if this implies no access to voice services is possible; and c) UE's voice setting indicating the above-referenced "CS Voice Only", "PS Voice Only", "IMS PS Voice Only", "CS Voice Preferred, IMS Voice Secondary", or "IMS Voice Preferred, CS Voice Secondary" indications. The UE voice setting is a UE setting that indicates the domain to use for voice services.

Table 1 summarizes this grouping and naming convention.

TABLE 1

Description of Voice Indicators

| Generic Name of Indicator used in this Application | Name of Indicators in the Specifications | Ownership of indicators |
|---|---|---|
| VoIMS indicator | "IMS Voice over PS session not supported" or "IMS Voice over PS session supported" | Set by NW. Provided by NW to UE in response to each NAS registration (e.g. EPS attach) or NAS registration update |
| UE's usage setting | "Voice centric" or "Data centric" or "Data only" | Could be provisioned by Operator or could be changed by the UE for example as a result of user input. |
| UE's voice setting | "CS Voice only" or "IMS PS voice only" or "CS voice preferred, IMS voice secondary" or "IMS voice preferred, CS voice secondary" | Could be provisioned by Operator or could be changed by the UE for example as a result of user input. |

In an example implementation, a network message may include a VoIMS indicator. For example, an ATTACH ACCEPT message in accordance with 3GPP TS 24.301 may be implemented as shown in Table 2 and/or in Iu mode in accordance with 3GPP TS 24.008 shown in Table 3. The VoIMS indicator may be sent by the network to a UE to indicate the support of voice via sessions of the IMS.

TABLE 2

ATTACH ACCEPT 3GPP TS 24.301

| IEI | Information Element | Type/Reference | Presence | Format | Length |
|---|---|---|---|---|---|
|  | Protocol discriminator | Protocol discriminator 9.2 | M | V | ½ |
|  | Security header type | Security header type 9.3.1 | M | V | ½ |
|  | Attach accept message identity | Message type 9.8 | M | V | 1 |
|  | EPS attach result | EPS attach result 9.9.3.10 | M | V | ½ |
|  | Spare half octet | Spare half octet 9.9.2.9 | M | V | ½ |
|  | T3412 value | GPRS timer 9.9.3.16 | M | V | 1 |
|  | TAI list | Tracking area identity list 9.9.3.33 | M | LV | 7-97 |
|  | ESM message container | ESM message container 9.9.3.15 | M | LV-E | 2-n |
| 50 | GUTI | EPS mobile identity 9.9.3.12 | O | TLV | 13 |
| 13 | Location area identification | Location area identification 9.9.2.2 | O | TV | 6 |
| 23 | MS identity | Mobile identity 9.9.2.3 | O | TLV | 7-10 |
| 53 | EMM cause | EMM cause 9.9.3.9 | O | TV | 2 |
| 17 | T3402 value | GPRS timer 9.9.3.16 | O | TV | 2 |
| 59 | T3423 value | GPRS timer 9.9.3.16 | O | TV | 2 |
| 4A | Equivalent PLMNs | PLMN list 9.9.2.8 | O | TLV | 5-47 |
| 34 | Emergency Number List | Emergency Number List 9.9.3.37 | O | TLV | 5-50 |
| 39 | VoIMS indicator | VoIMS indicator 9.9.x.y | O | TV | 1 |

TABLE 3

ATTACH ACCEPT 3GPP TS 24.008

| IEI | Information Element | Type/Reference | Presence | Format | Length |
|---|---|---|---|---|---|
| | Protocol discriminator | Protocol discriminator 10.2 | M | V | 1/2 |
| | Skip indicator | Skip indicator 10.3.1 | M | V | 1/2 |
| | Attach accept message identity | Message type 10.4 | M | V | 1 |
| | Attach result | Attach result 10.5.5.1 | M | V | 1/2 |
| | Force to standby | Force to standby 10.5.5.7 | M | V | 1/2 |
| | Periodic RA update timer | GPRS Timer 10.5.7.3 | M | V | 1 |
| | Radio priority for SMS | Radio priority 10.5.7.2 | M | V | 1/2 |
| | Radio priority for TOM8 | Radio priority 2 10.5.7.5 | M | V | 1/2 |
| | Routing area identification | Routing area identification 10.5.5.15 | M | V | 6 |
| 19 | P-TMSI signature | P-TMSI signature 10.5.5.8 | O | TV | 4 |
| 17 | Negotiated READY timer value | GPRS Timer 10.5.7.3 | O | TV | 2 |
| 18 | Allocated P-TMSI | Mobile identity 10.5.1.4 | O | TLV | 7 |
| 23 | MS identity | Mobile identity 10.5.1.4 | O | TLV | 7-10 |
| 25 | GMM cause | GMM cause 10.5.5.14 | O | TV | 2 |
| 2A | T3302 value | GPRS Timer 2 10.5.7.4 | O | TLV | 3 |
| 8C | Cell Notification | Cell Notification 10.5.5.21 | O | T | 1 |
| 4A | Equivalent PLMNs | PLMN List 10.5.1.13 | O | TLV | 5-47 |
| B- | Network feature support | Network feature support 10.5.5.23 | O | TV | 1 |
| 34 | Emergency Number List | Emergency Number List 10.5.3.13 | O | TLV | 5-50 |
| A- | Requested MS Information | Requested MS Information 10.5.5.25 | O | TV | 1 |
| 37 | T3319 value | GPRS Timer 2 10.5.7.4 | O | TLV | 3 |
| 38 | T3323 value | GPRS Timer 2 10.5.7.4 | O | TLV | 3 |
| 39 | VoIMS indicator | VoIMS indicator | O | TV | 1 |

As described herein, a UE has multiple protocol layers. An example UE, described herein includes 3 layers (IMS layer, NAS layer, and an AS layer). The example ordering is as follows: IMS is above the NAS and AS layers and the AS layer is a lower layer to the NAS and IMS layer. Therefore, the NAS layer and/or AS layer may be referred to as "lower layers" from the perspective of the IMS layer. The IMS layer may be referred to as an upper layer.

In some example implementations, after completion of an attach procedure in, for example, Iu mode, if the VoIMS indicator is available in the ATTACH ACCEPT message and indicates "IMS Voice over PS session supported" the successful completion of the attach procedure will be indicated to the upper layers, for example, for initiation of SIP registration to the IP Multimedia subsystem. Is some further example implementations, the successful completion of the attach procedures is indicated to the upper layer subject to the UE's voice setting being set to, for example, one of "PS Voice Only" or "IMS Voice Preferred, CS Voice Secondary".

In another example implementation, a TRACKING AREA UPDATE message in accordance with 3GPP TS 24.301 may be implemented as shown in Table 4.

FIG. 4: TRACKING AREA UPDATE

| IEI | Information Element | Type/Reference | Presence | Format | Length |
|---|---|---|---|---|---|
| | Protocol discriminator | Protocol discriminator 9.2 | M | V | 1/2 |
| | Security header type | Security header type 9.3.1 | M | V | 1/2 |
| | Tracking area update accept message identity | Message type 9.8 | M | V | 1 |

-continued

FIG. 4: TRACKING AREA UPDATE

| IEI | Information Element | Type/Reference | Presence | Format | Length |
|---|---|---|---|---|---|
|  | EPS update result | EPS update result 9.9.3.13 | M | V | 1/2 |
|  | Spare half octet | Spare half octet 9.9.2.9 | M | V | 1/2 |
| 5A | T3412 value | GPRS timer 9.9.3.16 | O | TV | 2 |
| 50 | GUTI | EPS mobile identity 9.9.3.12 | O | TLV | 13 |
| 54 | TAI list | Tracking area identity list 9.9.3.33 | O | TLV | 8-98 |
| 57 | EPS bearer context status | EPS bearer context status 9.9.2.1 | O | TLV | 4 |
| 13 | Location area identification | Location area identification 9.9.2.2 | O | TV | 6 |
| 23 | MS identity | Mobile identity 9.9.2.3 | O | TLV | 7-10 |
| 53 | EMM cause | EMM cause 9.9.3.9 | O | TV | 2 |
| 17 | T3402 value | GPRS timer 9.9.3.16 | O | TV | 2 |
| 59 | T3423 value | GPRS timer 9.9.3.16 | O | TV | 2 |
| 4A | Equivalent PLMNs | PLMN list 9.9.2.8 | O | TLV | 5-47 |
| 8- | NAS key set identifier$_{ASME}$ | NAS key set identifier 9.9.3.21 | O | TV | 1 |
| 34 | Emergency Number List | Emergency Number List 9.9.3.37 | O | TLV | 5-50 |
| 39 | VoIMS indicator | VoIMS indicator 9.9.x.y | O | TV | 1 |

In some example implementations in, for example, Iu mode, upon successful completion of the tracking area update procedure, the VoIMS indicator if received in the TRACKING AREA UPDATE ACCEPT message shall be indicated to the upper layers.

A ROUTING AREA UPDATE ACCEPT message may be sent by the network to the UE to provide the UE with GPRS mobility management related data in response to a ROUTING AREA UPDATE REQUEST from the UE. The ROUTING AREA UPDATE ACCEPT message, if received or provided to the UE, in accordance with, for example, 3GPP TS 24.008, may include a VoIMS indicator as shown in Table 5.

TABLE 5

ROUTING AREA UPDATE ACCEPT 3GPP TS 24.008

| IEI | Information Element | Type/Reference | Presence | Format | Length |
|---|---|---|---|---|---|
|  | Protocol discriminator | Protocol discriminator 10.2 | M | V | 1/2 |
|  | Skip indicator | Skip indicator 10.3.1 | M | V | 1/2 |
|  | Routing area update accept message identity | Message type 10.4 | M | V | 1 |
|  | Force to standby | Force to standby 10.5.5.7 | M | V | 1/2 |
|  | Update result | Update result 10.5.5.17 | M | V | 1/2 |
|  | Periodic RA update timer | GPRS Timer 10.5.7.3 | M | V | 1 |
|  | Routing area identification | Routing area identification 10.5.5.15 | M | V | 6 |
| 19 | P-TMSI signature | P-TMSI signature 10.5.5.8 | O | TV | 4 |
| 18 | Allocated P-TMSI | Mobile identity 10.5.1.4 | O | TLV | 7 |
| 23 | MS identity | Mobile identity 10.5.1.4 | O | TLV | 7-10 |
| 26 | List of Receive N-PDU Numbers | Receive N-PDU Number list 10.5.5.11 | O | TLV | 4-19 |
| 17 | Negotiated READY timer value | GPRS Timer 10.5.7.3 | O | TV | 2 |
| 25 | GMM cause | GMM cause 10.5.5.14 | O | TV | 2 |

TABLE 5-continued

ROUTING AREA UPDATE ACCEPT 3GPP TS 24.008

| IEI | Information Element | Type/Reference | Presence | Format | Length |
|-----|---------------------|----------------|----------|--------|--------|
| 2A | T3302 value | GPRS Timer 2 10.5.7.4 | O | TLV | 3 |
| 8C | Cell Notification | Cell Notification 10.5.5.21 | O | T | 1 |
| 4A | Equivalent PLMNs | PLMN List 10.5.1.13 | O | TLV | 5-47 |
| 32 | PDP context status | PDP context status 10.5.7.1 | O | TLV | 4 |
| B- | Network feature support | Network feature support 10.5.5.23 | O | TV | 1 |
| 34 | Emergency Number List | Emergency Number List 10.5.3.13 | O | TLV | 5-50 |
| 35 | MBMS context status | MBMS context status 10.5.7.6 | O | TLV | 2-18 |
| A- | Requested MS Information | Requested MS Information 10.5.5.25 | O | TV | 1 |
| 37 | T3319 value | GPRS Timer 2 10.5.7.4 | O | TLV | 3 |
| 38 | T3323 value | GPRS Timer 2 10.5.7.4 | O | TLV | 3 |
| 39 | VoIMS indicator | VoIMS indicator 10.5.x.y | O | TV | 1 |

In, for example, Iu mode, the network may include the VoIMS indicator in a ROUTING AREA UPDATE ACCEPT message (or any other message) to indicate the support of voice via sessions of the IMS.

In another example, the combined routing area updating procedure is initiated by a GPRS MS operating in MS operation modes A or B, if the MS is in state GMM-REGISTERED and MM-IDLE, and if the network operates in network operation mode I and if in Iu mode, when the UE receives an indication from the upper layers that the SIP registration to the IP Multimedia subsystem has failed and subject to the UE's usage setting being set to, for example, "Voice Centric".

In some implementations, after completion of an attach procedure or a registration update procedure in accordance with, for example, 3GPP TS 24.008, access to an IM CN may be initiated. For example, access may be initiated in accordance with 3GPP TS 24.229 section 6.2 B.2.2.1. For example, the access to the IM CN may be initiated when the UE is not already registered to the IM CN subsystem and the UE's usage setting is not "Voice Centric." In another example, the access to the IM CN may be initiated when the UE is not already registered to the IM CN subsystem and the UE's voice setting is "PS Voice Only" or the UE's voice setting is "IMS Voice Preferred, CS Voice Secondary." In yet another example, an indication of IM CN subsystem registration failure may be provided to the lower layers under the following conditions:

if registration to the IM CN subsystem fails; or if, after failing repeated attempts to register to the IM CN sybsystem, the UE reaches a pre-set number of retries and terminates further attempts; or if after failing repeated attempts to register, the user aborts further attempts to register to IM CN subsystem if a user initiated de-registration is performed; or if the UE is explicitly or implicitly deregistered by the network.

In some implementations, the UE may perform actions upon NAS indication to select specific RATs. In some implementations, when a UE receives a message that includes an information element for "Capability Update Requirement" and an information element for "System specific capability update requirement list" is included, then for each of the RAT requested in a "UE system specific capability" information element, if the UE supports the listed RAT, the UE may:if the listed RAT is E-UTRAN and the NAS has not provided an indication to AS to select GERAN or UTRAN or the listed RAT is not E-UTRAN, include the inter-RAT radio access capabilities for the listed RAT in the IE "UE system specific capability" from the variable UE_CAPABILITY_REQUESTED. Additionally, if the listed RAT is GSM and PS Handover to GPRS is supported, include the IE "MS Radio Access Capability" in the variable UE_CAPABILITY_REQUESTED.

In some further implementations, the UE may perform actions upon NAS indication to select specific RATs. In some implementations, when performing cell selection when leaving RRC_CONNECTED state, on transition from RRC_CONNECTED to RRC_IDLE as a result of a NAS indication to select GERAN or UTRAN, the UE may perform cell selection on GERAN and UTRAN RATs and disable cell selection and reselection to E-UTRAN cells. Similarly, if NAS provides an indication to AS to select GERAN or UTRAN while the UE is in RRC_IDLE, the UE shall perform cell selection on GERAN and UTRAN RATs and enable cell selection and reselection to E-UTRA cells.

In some further implementations, when performing cell selection when leaving RRC_CONNECTED state, on transition from RRC_CONNECTED to RRC_IDLE as a result of a NAS indication to select GERAN or UTRAN, the UE shall perform cell selection on GERAN and UTRAN RATs and disable cell selection and reselection to E-UTRA cells. If NAS provides to the AS an indication to select GERAN or UTRAN, while the UE is in RRC_IDLE, the UE shall perform cell selection on GERAN and UTRAN RATs and disable cell selection and reselection to E-UTRA cells.

Figure 1B:
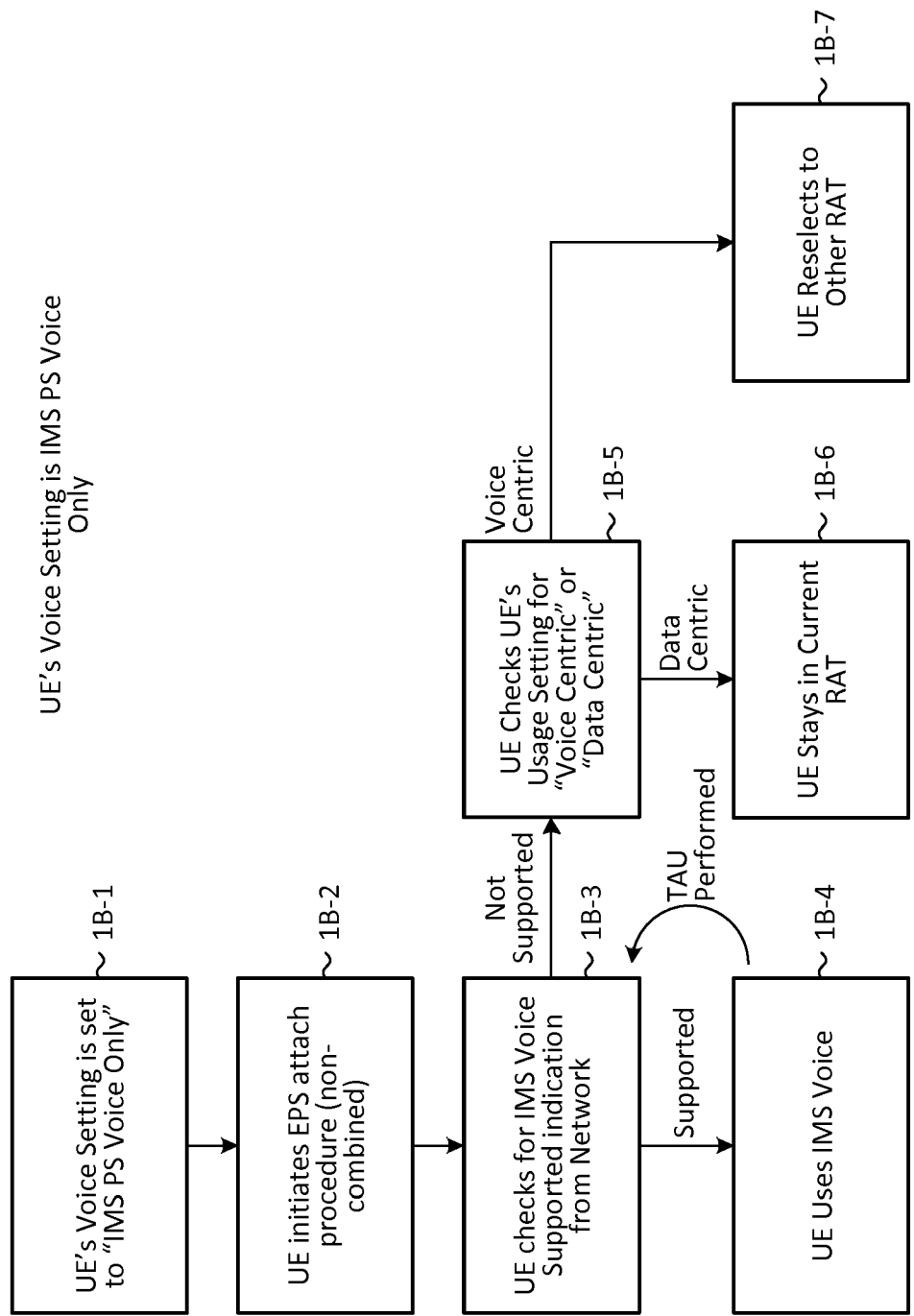

If NAS provides an indication to AS to select GERAN or UTRAN while the UE is in RRC_CONNECTED, the UE may perform the following action upon leaving RRC_CONNECTED, with a release cause of 'other':

reset MAC;

stop all timers that are running except T320;

release all radio resources, including release of the RLC entity, the MAC configuration and the associated PDCP entity for all established RBs;

indicate the release of the RRC connection to upper layers together with the release cause;

if leaving RRC_CONNECTED was not triggered by reception of the MobilityFromEUTRACommand message:

enter RRC_IDLE by performing cell selection in accordance with the cell selection process, defined for the case of leaving RRC_CONNECTED, for example, as specified in 3GPP TS 36.304;

FIGS. 1A and 1B respectively show Figure A.2.1-1 and Figure A.4-1 of S2-094178 [iii], and illustrate two use case scenarios. The first use case is when the UE's voice setting is set to "IMS voice preferred, CS voice secondary" and the second use case is when the UE's voice setting is set to "IMS voice only". These figures indicate the required UE actions for different combinations of the network's VoIMS indicator and the UE's usage setting.

Referring first to FIG. 1A, the behavior for the UE's voice setting of "IMS voice preferred, CS voice secondary" begins at block 1A-1 which simply shows that the UE's voice setting is set to IMS voice preferred, CS voice secondary. In block 1A-2, the UE initiates an EPS attach procedure (non combined). In block 1A-3, the UE checks for the IMS voice supported indication from the network, which is received as part of the response to the EPS attach procedure. If IMS voice is supported, then in block 1A-4, the UE uses IMS voice. While attached to the system, the UE may perform a Tracking Area Update (TAU) either periodically or when to UE moves to a different Tracking Area (TA). When performing the TAU the UE may receive a new VoIMS indicator in which case the UE processing returns to the block 1A-3 where the VoIMS indicator is checked. If IMS voice is not supported, then in block 1A-5, the UE performs the combined TA/LA Update Procedure (also referred to as the combined TAU) for CSFB as in TS 23.272. If there is success, then in block 1A-6, the UE stays in E-UTRAN and uses CSFB if it requires voice services. Upon successful completion of the tracking area update procedure, a VoIMS indicator received in the TRACKING AREA UPDATE ACCEPT message shall be indicated to the upper layers. On the other hand, if there is failure, then in block 1A-7, the UE checks the UE's usage setting for "Voice centric" or "Data centric" setting. If the setting is data centric, then in block 1A-8, the UE stays in the current RAT (E-UTRAN). On the other hand, if the setting is voice centric, then in block 1A-9, the UE selects another RAT in which it may obtain voice services.

A combined registration procedure such as a Combined Attach Procedure or a Combined Tracking Area Update refers to a single NAS registration procedure that is used to attempt to register for both PS services and CS services, where the CS voice service is provided on E-UTRAN by means of CS Fall back (CSFB). For example, a UE operating in CS/PS mode 1 or CS/PS mode 2, in the EMM-REGISTERED state, shall initiate the combined tracking area updating procedure when, for example, the UE receives an indication from the upper layers that the SIP registration to the IMS has failed and the UE's usage setting is "Voice Centric." An example of a Combined Attach Procedure or a Combined Tracking Area Update can be found in 3GPP TS 24.301.

Success of a combined registration procedure means that the UE is registered for both PS and CS services. Failure of a combined procedure means that the UE is registered for PS services but not for CS services. For example, such a failure may be indicated to the UE by the network sending a Tracking Area Update Accept or Attach Accept message with an indication or cause value set to 'CS domain not available' or a value indicating that the PS domain is not available. In addition there may be other failures, such as a failure where the UE is not registered for CS or PS services.

As a result of a NAS registration procedure or an EPS attach procedure, a UE initiating the procedures is registered with the network. As a result of this NAS registration, the UE and the network obtain information enabling the sending of and the receiving of (IP) messages as part of the Non-access stratum protocols. The UE and the network can send and receive these (IP) messages. The obtained information in the UE and the network may need updating. The obtained information can be periodically updated (e.g. due a timer expiring) or explicitly updated. A NAS registration can be a combined or a non-combined NAS registration, a successful combined NAS registration cause a UE to be registered for EPS services and non-EPS services.

As used herein, EPS services may be GPRS services in accordance with 3GPP TS 24.008. Non-EPS services are services provided by a CS domain. As used herein, non-EPS services may be non-GPRS services in accordance with 3GPP TS 24.008. A UE which camps on E-UTRAN can attach to both EPS services and non-EPS services. Non-access stratum (NAS) protocols are protocols between UE and mobile switching center (MSC) or serving GRPS support node (SGSN) that are not terminated in the UTRAN, and the protocols between UE and MME that are not terminated in the E-UTRAN.

In one implementation, a UE initiating a NAS registration (e.g., a combined NAS registration) procedure can send at least one of an ATTACH REQUEST (e.g., a combined ATTACH REQUEST) message or Tracking Area Update Request (e.g., a combined Tracking Area Update Request) message. Subsequent to sending the message, the UE can receive at least one of an ATTACH ACCEPT (e.g., a combined ATTACH ACCEPT) message or Tracking Area Update Request (e.g., a combined Tracking Area Update Request) message.

In one implementation, a UE updating the NAS registration (e.g. combined NAS registration) information may include an update of the routing area information when using the Non-access stratum protocols between the UE and the SGSN or updating the tracking area information when using the Non-access stratum protocols between the UE and the MME or updating the information when using the Non-access stratum protocols between the UE and the MSC. A UE updating the NAS registration (e.g. combined NAS registration) information can send at least one of a TRACKING AREA UPDATE (e.g., combined TRACKING AREA UPDATE), a ROUTING AREA UPDATE (e.g., a combined ROUTING AREA UPDATE). Subsequent to sending the message, the UE can receive at least one of a TRACKING AREA UPDATE (e.g., a combined TRACKING AREA UPDATE) (ACCEPT) response, a ROUTING AREA UPDATE (e.g., a combined ROUTING AREA UPDATE) (ACCEPT) response. After successful updating the NAS registration (e.g. combined NAS registration) information, a UE is registered for EPS services and non-EPS services.

In one implementation, after performing the NAS registration procedure, the UE can request a service from the network. The UE then sends a service request (e.g., an extended service request) message to the network. For example, in order to perform CSFB, the UE is registered for EPS services and non-EPS services, and the UE sends an extended service request NAS protocol message. The UE can receive a SERVICE REJECT message in response.

For example, in some implementations, when a UE receives an ATTACH ACCEPT message with EMM cause value #18 indicative of "CS domain not available," the UE may perform the following actions in accordance with 3GPP TS 24.301:

The UE shall stop timer T3410 if still running, shall reset the tracking area updating attempt counter, shall set the EPS update status to EU1 UPDATED and shall enter state EMM-REGISTERED.NORMAL-SERVICE.

The UE shall set the update status to U2 NOT UPDATED.

A UE in CS/PS mode 1 of operation may select GERAN or UTRAN radio access technology rather than E-UTRAN for the selected PLMN or equivalent PLMN.

A UE in CS/PS mode 2 of operation shall not attempt combined attach or combined tracking area update procedure with current PLMN until switching off the UE or the UICC containing the USIM is removed.

A UE whose UE's usage setting is "Data Centric" or "Data Only" will provide a notification to the user or the upper layers that CS domain is not available.

If the UE's usage setting is changed from "Data Centric" or "Data Only" to "Voice Centric," an indication shall be provided to the AS to select GERAN or UTRAN radio access technology rather than E-UTRAN for the selected PLMN or equivalent PLMN.

In some implementations, when a NAS provides an indication to an AS to select GERAN or UTRAN while the UE is in RRC_IDLE, the UE may disable cell selection and reselection to E-UTRAN cells. When a NAS provides an indication to an AS to select GERAN or UTRAN or E-UTRAN while the UE is in RRC_IDLE, the UE may enable cell selection and reselection to E-UTRAN cells.

In another example, if a service request cannot be accepted by the network, the network will return a SERVICE REJECT message to the UE including an appropriate EMM cause value. On receipt of the SERVICE REJECT message, the UE shall stop timer T3417 and take appropriate action. For example, the EMM cause value may be #18 (CS domain not available). If the request was related to CS fallback, the UE shall send an indication to the MM sublayer and shall not attempt CS fallback until a combined tracking area updating procedure has been successfully completed. The UE may then enter the state EMM-REGISTERED.NORMAL-SERVICE. If the UE usage setting is "Data Centric" or "Data Only," the UE will provide a notification to the user or the upper layers that CS domain is not available.

Referring now to FIG. 1B, the behavior for UE voice setting of "IMS PS Voice only" begins at block 1B-1 which simply shows the UE set to IMS PS voice only. In block 1B-2, the UE initiates an EPS attach procedure (non combined). In block 1B-3, the UE checks for the IMS voice supported indication from the network. If IMS voice is supported, then in block 1B-4, the UE uses IMS voice. While attached to the system to UE may perform a Tracking Area Update either periodically or when to UE moves to a different Tracking Area. When performing the TAU the UE may receive a new VoIMS indicator in which case the UE processing returns to the block 1B-3 where the VoIMS indicator is checked. If IMS voice is not supported, then in block 1B-5, UE checks the UE's usage setting for "Voice centric" or "Data centric". If the setting is "Data centric", then in block 1B-6, the UE stays in the current RAT (E-UTRAN). On the other hand, if the setting is "Voice centric, then in block 1B-7, the UE selects another RAT in which it may obtain voice services.

First Problem: Failure to Initiate IMS Registration

A first problem with the behavior specified in the above-referenced FIG. 1A and FIG. 1B is that there is no guarantee that the UE will initiate IMS registration. More specifically, if the VoIMS indicator indicates "IMS Voice over PS session supported" then the UE is expected to "use IMS Voice", but there is no guarantee that the UE will definitely initiate an IMS registration when the UE's voice setting is set to "IMS PS voice only" and "IMS voice preferred, CS voice secondary". If the VoIMS indicator shows "IMS Voice over PS session supported", then the UE knows that there is no NAS or AS reason that would mean it cannot realize voice services over IMS. However, in order for this to be achieved, the UE must first initiate an IMS registration.

The reference to an IMS Registration to an IMS Subsystem can generally be understood to refer to any method of the network obtaining information required in order to be able to send information to, and receive information from the UE using IMS. Accordingly, the network either has obtained the information required in order to be able to send information to, and receive information from the UE using IMS, or the network does not have the information. A network may not have said information due to registration failure or due to the UE having failed to register (e.g. the UE not having initiated an IMS registration to provide the network with said information). A SIP Registration for voice services to an IMS Subsystem, as per 3GPP TS 24.229 is a specific example.

When performing an IMS Registration for voice services, the UE must include proper indicator(s) such that the IMS Subsystem knows that it is requesting voice services. If a proper indicator is not included or granted, then a UE camping on an IMS capable E-UTRAN cell will still not receive IMS voice services or IMS voice mobile terminated session requests.

In some implementations, in order to ensure that the UE reacts appropriately and initiates an IMS Registration, the UE will behave as follows:

If UE's voice setting="IMS PS voice only" OR If UE's voice setting="IMS voice preferred, CS voice secondary"

AND the VoIMS Indicator indicates "IMS Voice over PS session supported";

THEN IMS registration will be triggered with proper indicator(s) requesting voice service support.

For example, upon successful completion of an attach procedure, if the VoIMS indicator in an ATTACH ACCEPT message indicates "IMS Voice over PS session supported" and subject to the UE's voice setting the successful completion of the attach procedure will be indicated to the upper layers for initiation of SIP registration to the IMS.

As indicated above, in some implementations, the IMS registration is achieved through a SIP registration. Examples of SIP messages are SIP Requests and SIP Responses. Examples of a SIP Request is a SIP INVITE or a SIP REGISTER. Examples of IMS functional elements are P-CSCF, S-CSCF, I-CSCF, AS, SCC AS, HSS.

IMS Registration can be performed using a SIP Register request as described in IETF RFC 3261; the SIP Register requests are processed by an IMS functional element as documented in 3GPP TS 23.228 and 3GPP TS 24.229.

Figure 2A:
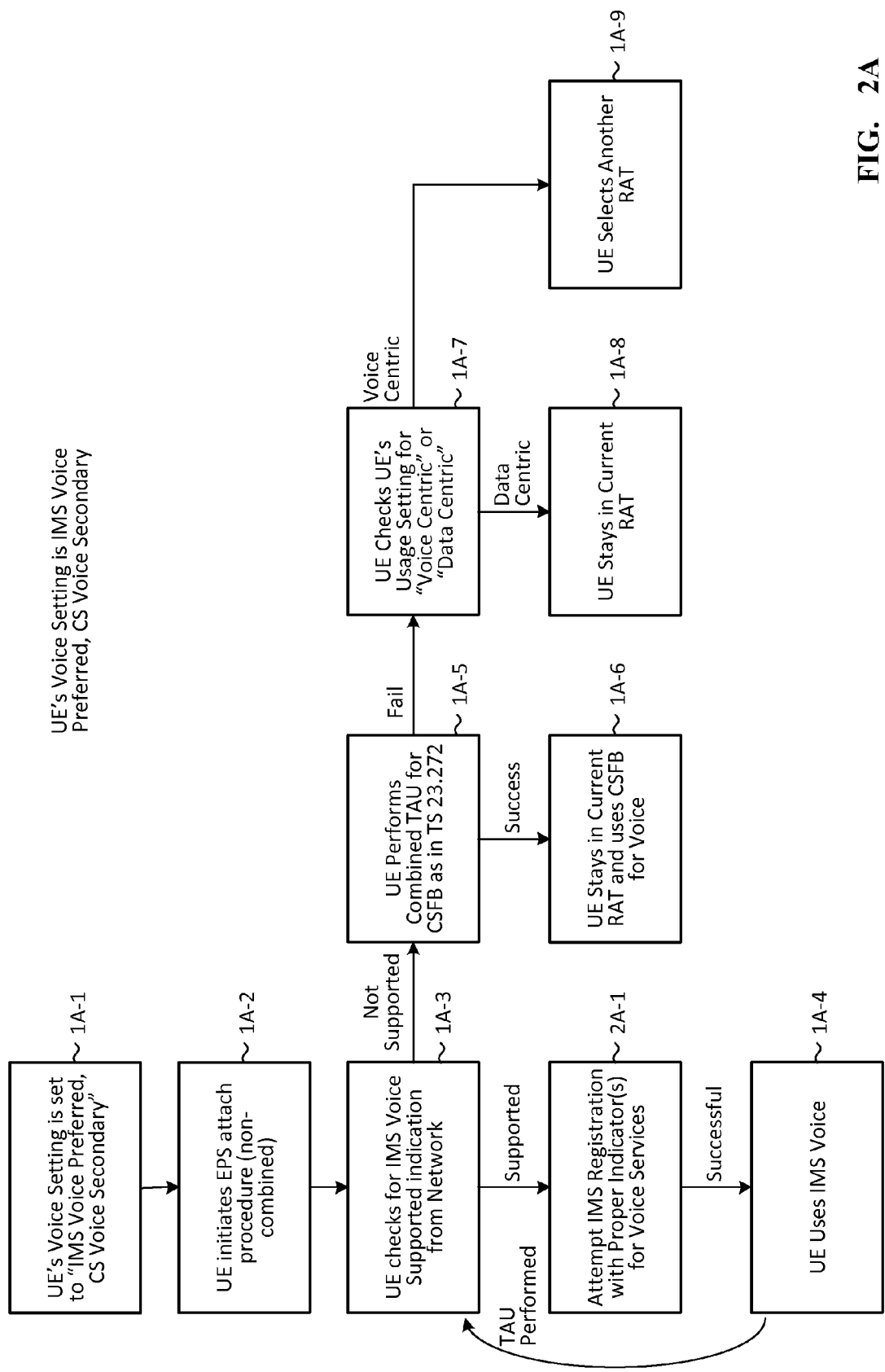

FIG. 2A shows a detailed flowchart of an example implementation for the case where the UE's voice setting is set to "IMS voice preferred, CS voice secondary". The figure differs from FIG. 1A in the inclusion of block 2A-1 which involves attempting IMS registration with proper indicators for voice services. In the case that the UE uses IMS voice at block 1A-4 and then performs a TAU then the UE will again check the VoIMS indicator at block 1A-3 and if VoIMS is supported then at block 2A-1 the UE will only attempt IMS Registration with proper indicators for voice services if it is not already IMS registered for voice services.

Figure 2B:
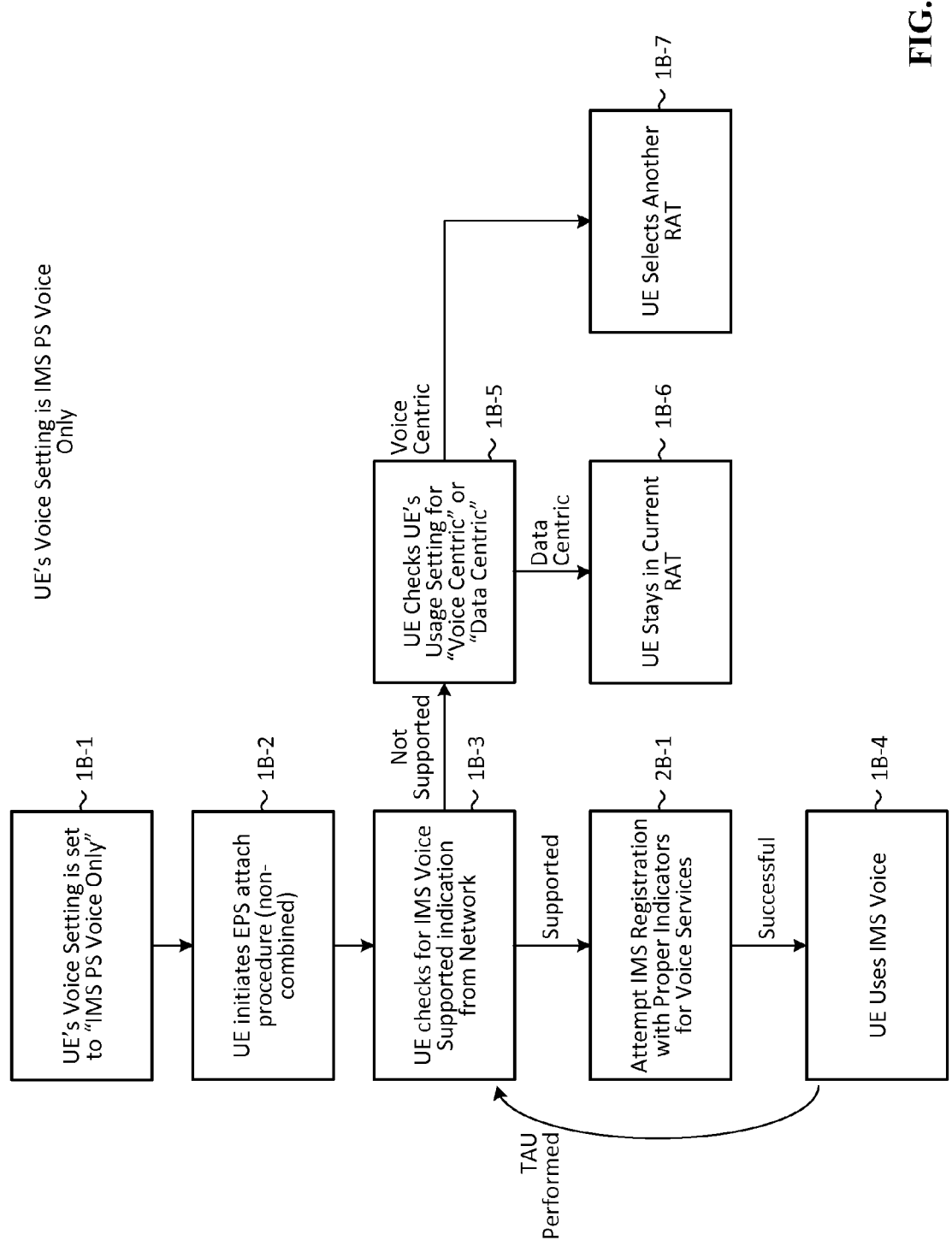

FIG. 2B shows a detailed flowchart of an example implementation for the case where the UE voice setting is set to "IMS PS voice only". The figure differs from FIG. 1B in the inclusion of block 2B-1 which involves attempting IMS registration with proper indicators for voice services. In the case that the UE uses IMS voice at block 1B-4 and then performs a TAU then the UE will again check the VoIMS indicator at block 1B-3 and if VoIMS is supported then at block 2B-1 the UE will only attempt IMS Registration with proper indicators for voice services if it is not already IMS registered for voice services.

Second Problem: IMS Registration for Voice May Fail

A second problem with the behavior described above with reference to FIGS. 1A and 1B is that there is no guarantee IMS registration for voice will succeed. More specifically, there is no guarantee that the IMS registration for voice will succeed, just because EPS attach or Tracking Area Update is successful and the network supports IMS Voice. One example of a reason that the registration might fail is because the SIP Registrar does not allow it because of limitations in the subscription of the user. Another example of a reason is that the IMS registration fails due to dropped messages or a delay in receiving messages. If the IMS registration fails, and the UE does nothing and remains EPS attached but not IMS registered for voice services, then no IMS voice sessions—mobile originated or mobile terminated—can be realized. This same situation may exist if the SIP registration succeeded however the indicator in the request for voice services was not allowed (that is, the requested indicator for voice was not returned in the SIP 2000K response to the SIP Register Request). In this case, the UE may be registered in IMS for the use of some services but may not be allowed to use this registration for transmitting voice media.

Example 1

In some implementations, the UE is configured to address this problem by recognizing a situation where IMS registration for voice has failed, the UE's voice setting is set to "IMS Voice Preferred, CS Voice Secondary". Upon recognizing this situation, the UE is configured to immediately attempt a combined registration procedure. This will then allow the UE to obtain voice services by means of CSFB if this is supported. If the combined registration procedure fails, then the UE considers the UE's usage setting. If the UE's usage setting is "Voice Centric" or "Data Centric", then the UE selects another RAT in which it may obtain voice services. If the UE's usage setting is "Data Only", then the UE stays in the current RAT (i.e. E-UTRAN) without access to voice services.

Figure 3A:
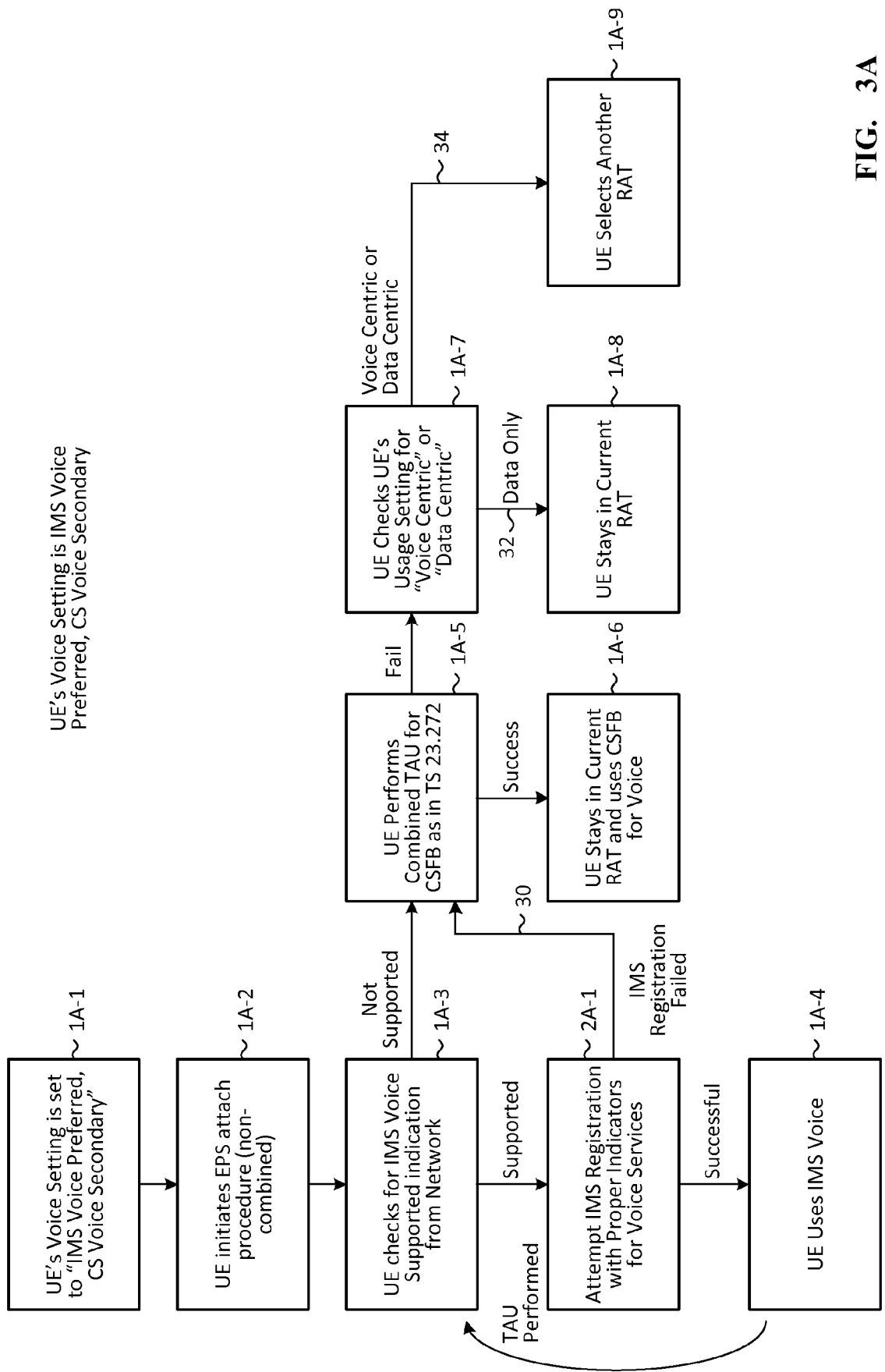

FIG. 3A shows a detailed flowchart of an example implementation for this case. The figure differs from FIG. 2A in that if IMS registration fails following triggering of IMS registration in block 2A-1, as indicated at 30, then processing continues in block 1A-5 with the performance of a combined registration procedure for CSFB as in TS 23.272. In addition, block 1A-8 (staying in the current RAT) is performed if the UE is "data only" (as indicated at 32), and block 1A-9 is performed (UE selects another RAT) if the UE is "voice centric" or "data centric" (as indicated at 34).

Figure 3B:
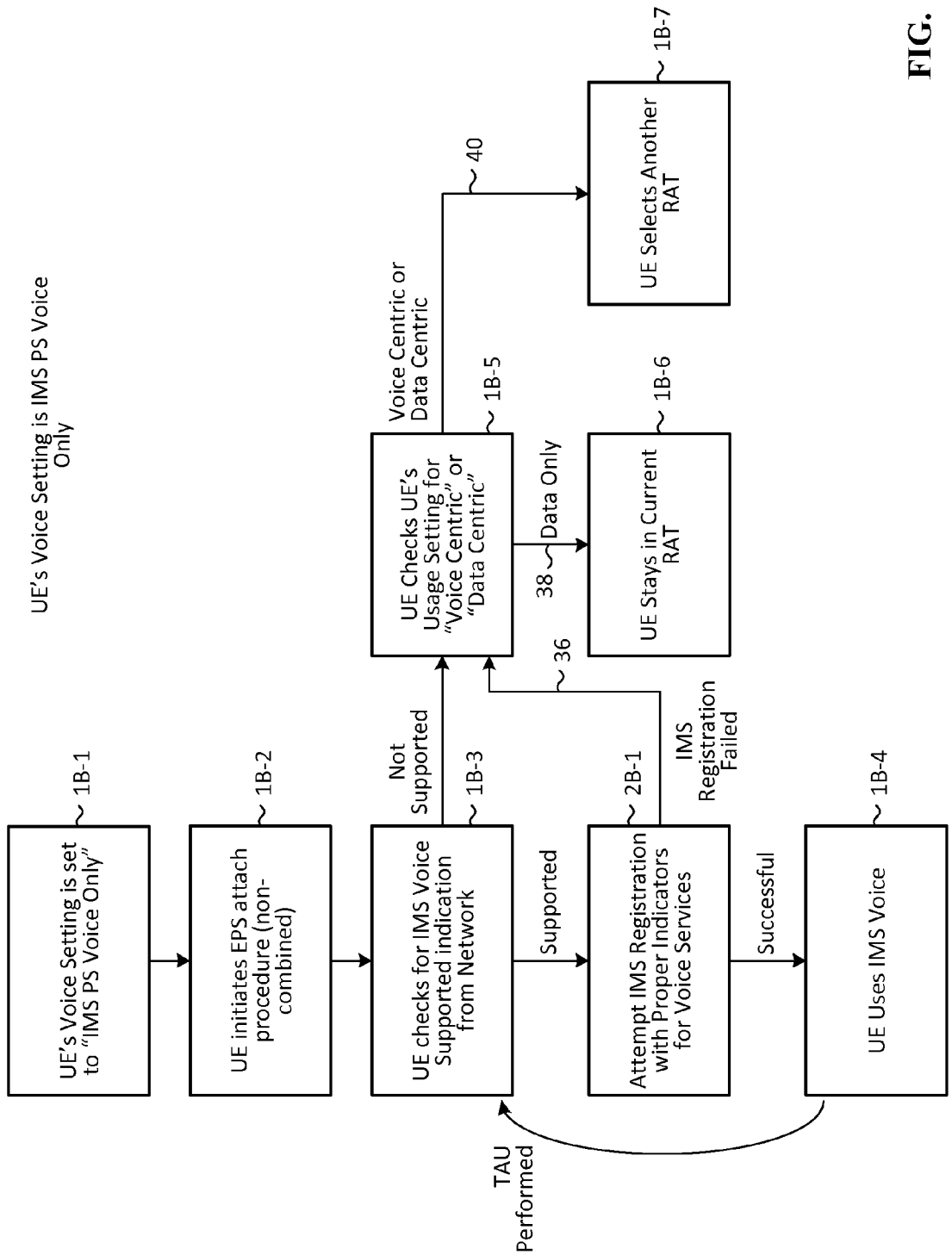

FIG. 3B shows a detailed flowchart of an example implementation for the case where the UE's voice setting is set to "IMS PS voice only". The figure differs from FIG. 2B in that if IMS registration fails following triggering of IMS registration in block 2B-1, as indicated at 36, then the UE checks the UE's usage setting at block 1B-5. If the UE's usage setting is "Data Only" (as indicated at 38), then the UE stays in E-UTRAN and will not have access to voice services in block 1B-6. If the UE's usage setting is "Voice centric" or if the UE's usage setting is "Data Centric" (as indicated at 40), then the UE selects another RAT in which it may obtain voice services in block 1B-7.

Example 2A

In some implementations, the UE is configured to address this problem by recognizing a situation where IMS registration for voice services has failed and the UE's usage setting is "Data Only". Upon recognizing this situation, the UE is configured to stay in EPS where the best PS services can be provided. More specifically, the UE stays in E-UTRAN (the "current RAT" in the figures) and does not select another RAT. The best PS services can be provided in E-UTRAN. PS Services can also be provided in GERAN/UTRAN but they are provided in a less optimized manner in these RATs. The UE does not perform a combined registration attempt, but instead the UE is configured to retry the IMS registration procedure for voice services. It is noted that the UE may have successfully registered with IMS for other services but may have been denied access to voice services, as described above, and in this event, the UE retries the IMS registration procedure for voice services. In some implementations, this is a single retry. In other implementations there are multiple retries which may, for example, be periodically executed.

Figure 4A:
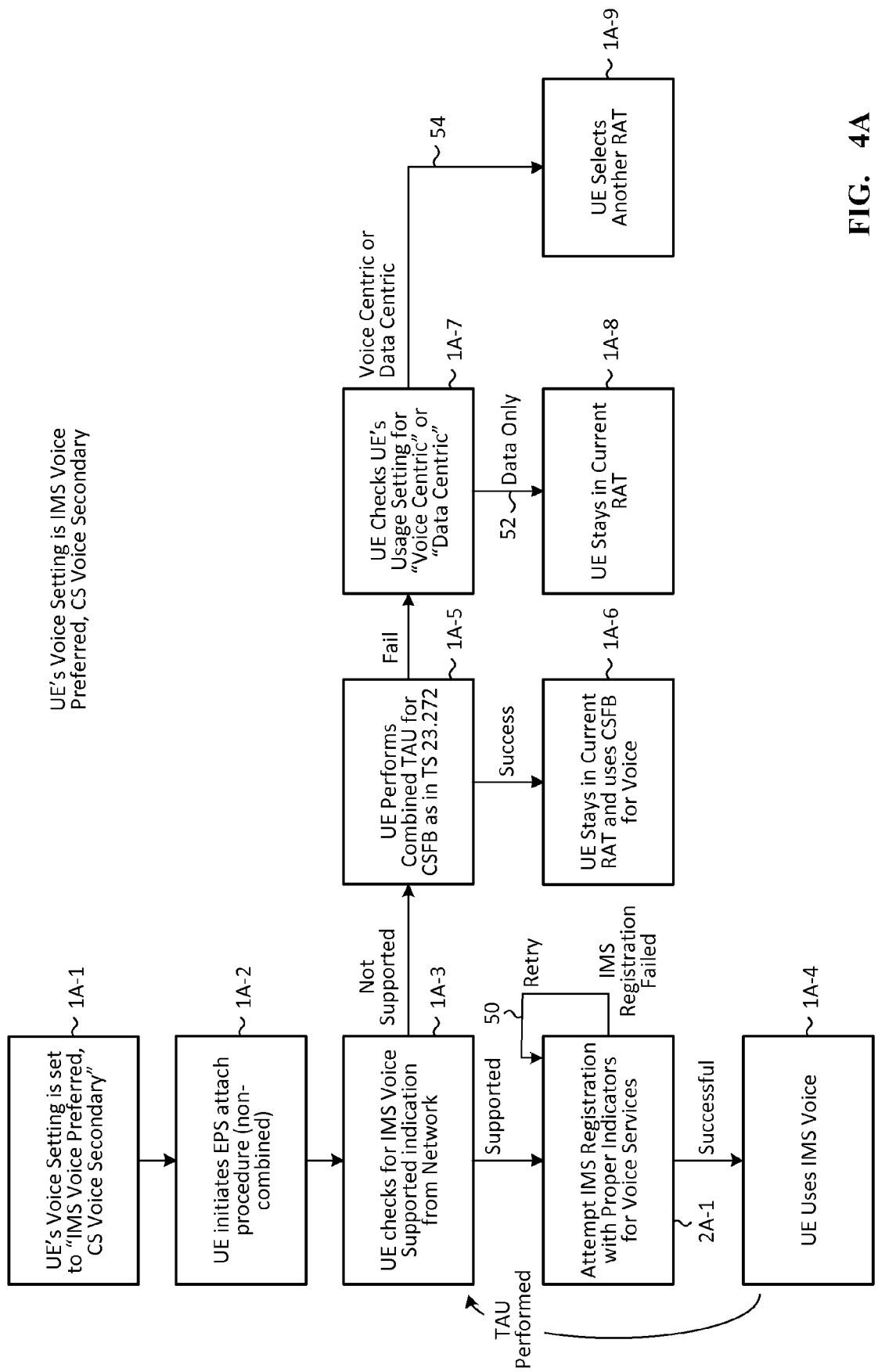
Figure 4B:
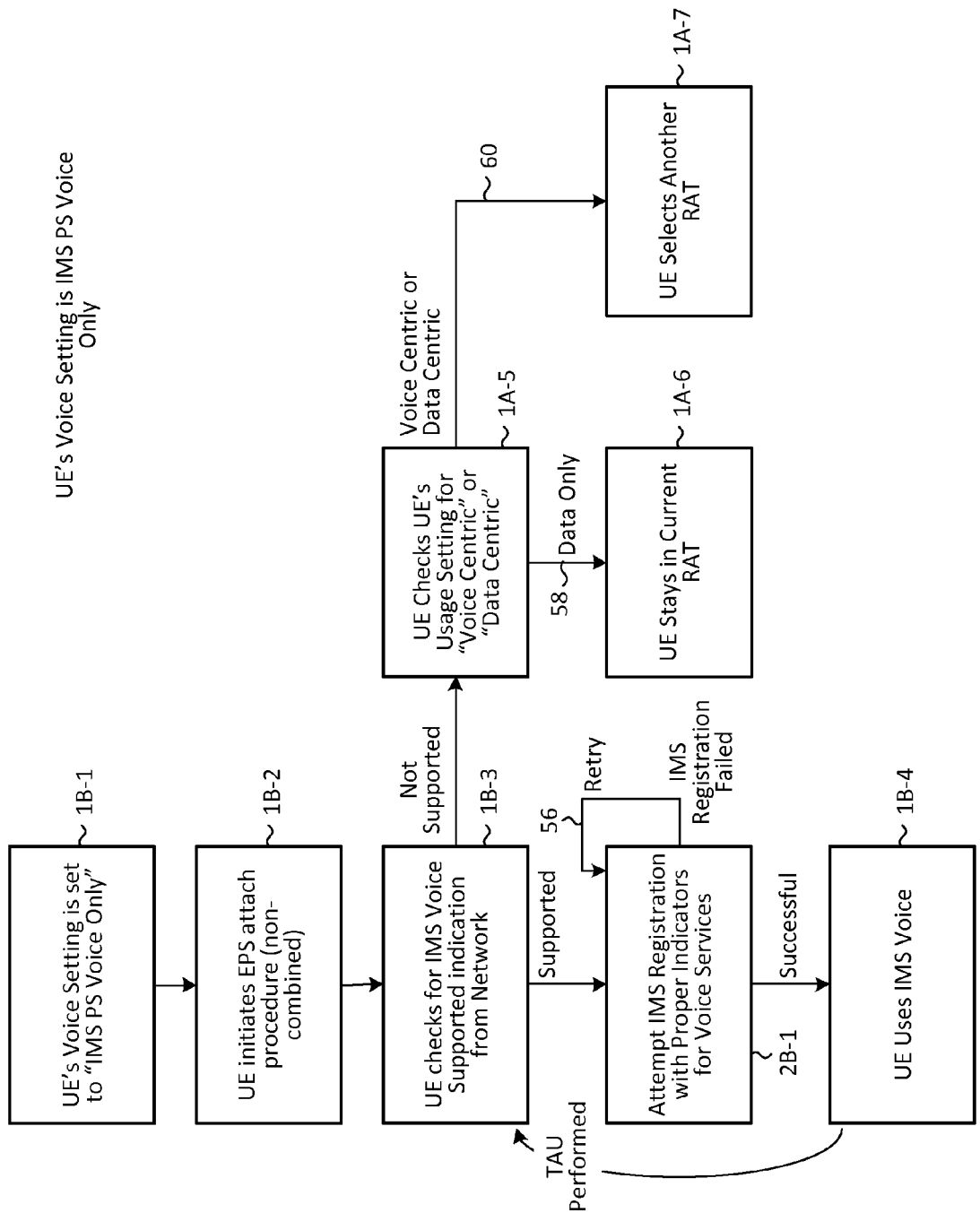

An example of this behavior is depicted in FIGS. 4A and 4B. Referring first to FIG. 4A, FIG. 4A is the same as FIG. 2A with the exception of three differences:

the UE performs one or more retries at 50 after IMS registration has failed;

block 1A-8 is executed following block 1A-7 if the UE's usage setting is "data only" (indicated at 52);

block 1A-9 is executed following block 1A-7 if the UE's usage setting is "voice centric" or "data centric" (indicated at 54).

Referring now to FIG. 4B, FIG. 4B is the same as FIG. 2B with the exception of three differences:

the UE performs one or more retries at 56 after IMS registration has failed;

block 1B-6 is executed following block 1B-5 if the UE's usage setting is "data only" (indicated at 58);

block 1B-7 is executed following block 1B-5 if the UE's usage setting is "voice centric" or "data centric" (indicated at 60).

Example 2C

In some implementations if the combined attach procedure described in example 1 above fails, and the UE's usage setting is "Data Only", the UE notifies the user (via the user interface or some other alert) that voice services are unavailable. For example, if voice services cannot be realized, an indicator may be presented to the user. Any indicator to the user (displayed, audio, vibrating, are just some examples) could be used to convey to the user that voice services are not currently able to be provided even though the UE is in a coverage area.

Figure 5A:
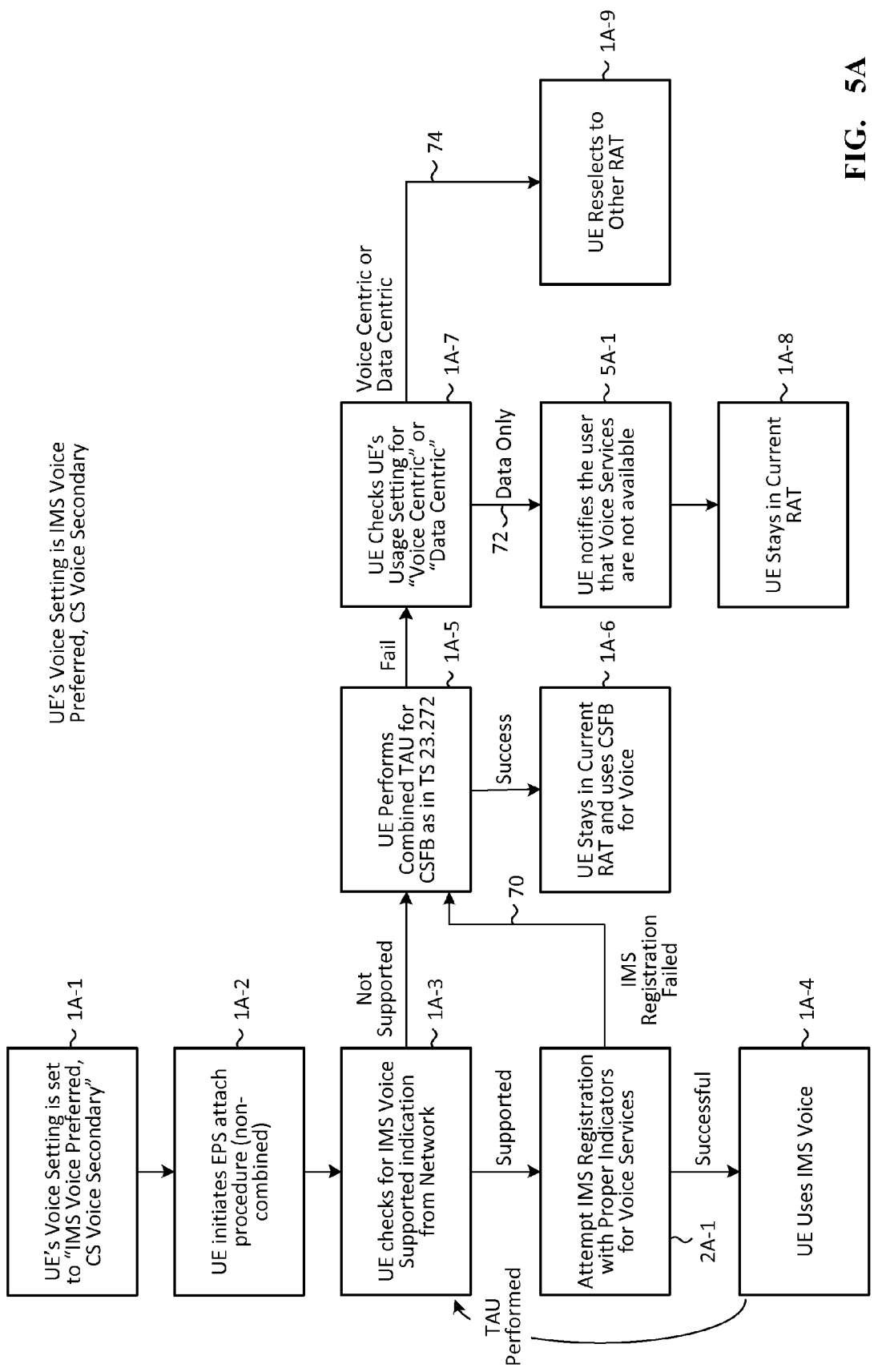

An example of this behavior is depicted in FIG. 5A which is the same as FIG. 2A with the following differences:

upon IMS registration failure at 70 following an IMS registration attempt, the UE performs a combined TAU at block 1A-5;

after block 1A-7, if the UE's usage setting is "data only" (as indicated at 72), the UE notifies the user that voice services are not available at block 5A-1 and the UE stays in the current RAT;

block 1A-9 follows block 1A-7 if the UE's usage setting is "voice centric" or "data centric" (as indicated at 74).

Figure 5B:
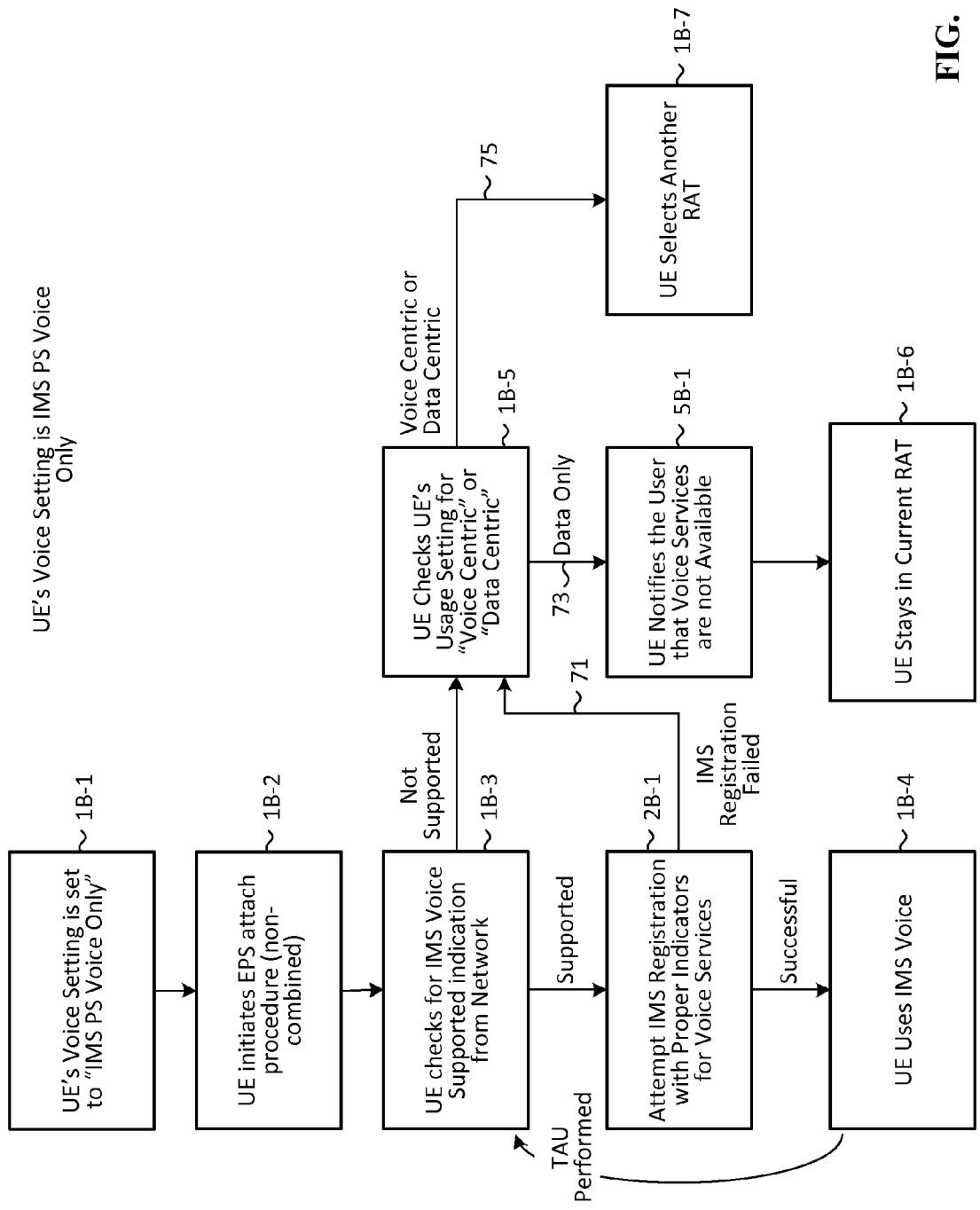

Another example of this behavior is depicted in FIG. 5B which is the same as FIG. 2B with the following differences:

upon IMS registration failure at 71 following an IMS registration attempt, the UE checks the UE's Usage Setting for "Voice Centric" or "Data Centric" in block 1B-5;

after block 1B-5, if the UE's usage setting is "data only" (as indicated at 73), the UE notifies the user that voice services are not available at block 5B-1 and the UE stays in the current RAT;

block 1B-7 follows block 1B-5 if the UE's usage setting is "voice centric" or "data centric" (as indicated at 75).

Upon being notified that voice services are not available, the user may choose to change the UE's usage setting to "Voice Centric" or "Data Centric". As the UE has already attempted a combined registration procedure and the attempt failed then the change of the UE's usage setting to "Voice Centric" or "Data Centric" will cause the UE to selects to another RAT (such as GERAN/UTRAN) which could provide voice.

In some implementations, the notification to the user that voice services are not available also includes a prompt asking the user if they would like to change the UE's usage setting in order be obtain voice service.

Figure 6A:
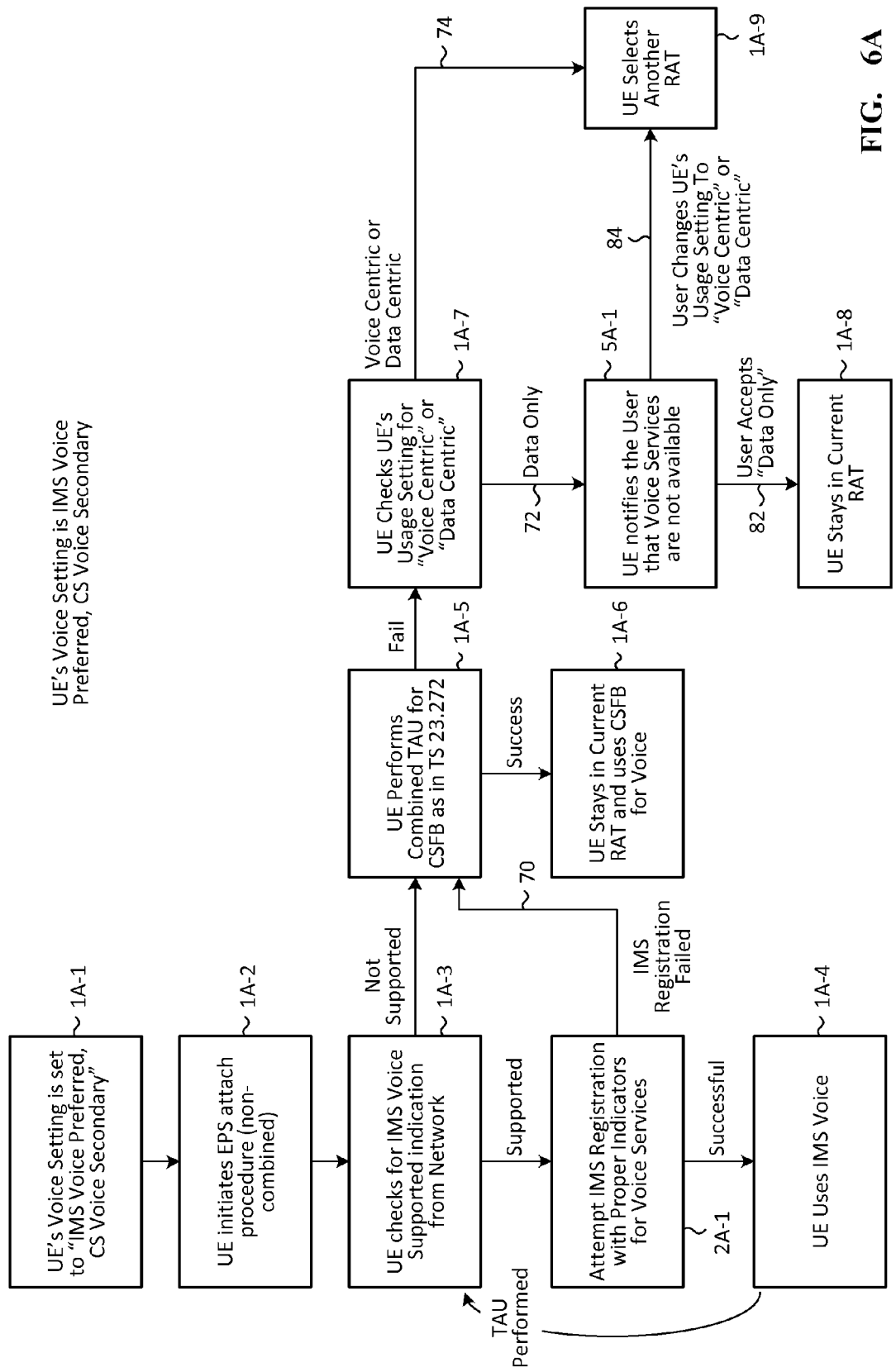

An example of this behavior is depicted in FIG. 6A. FIG. 6A is the same as FIG. 5A with the following differences:

after block 5A-1, if the user accepts "data only" (indicated at 82), then the UE stays in the current RAT at block 1A-8;

after block 5A-1, if the user changes the UE's usage setting to "voice centric" or "data centric" (indicated at 84), then the UE selects another RAT at block 1A-9.

In some implementations, when the UE's usage setting is changed from "data centric" to "voice centric," the UE provides an indication to the AS to select GERAN or UTRAN radio access technology rather than E-UTRAN for the selected PLMN or equivalent PLMN. For example, such a process may be completed after the UE receives EMM cause value #18.

Figure 6B:
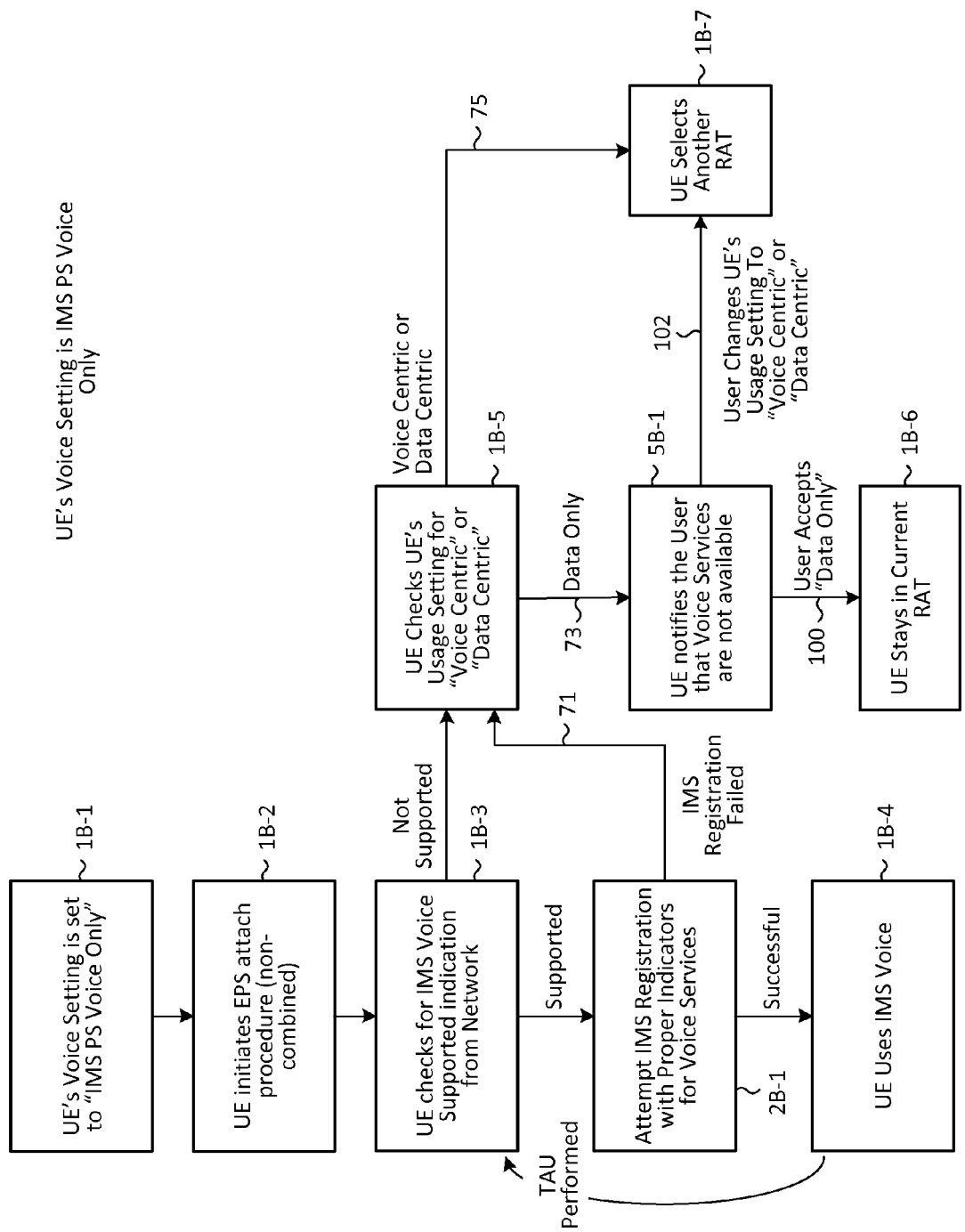

Another example of this behavior is depicted in FIG. 6B. FIG. 6B is the same as FIG. 5B with the following differences:

after block 5B-1, if the user accepts "data only" (indicated at 100), then the UE stays in the current RAT at block 1B-6;

after block 5B-1, if the user changes the UE's usage setting to "voice centric" or "data centric" (indicated at 102), then the UE selects another RAT at block 1A-9.

Example 2D

In the case where the UE's voice setting is "IMS Voice Preferred, CS Voice Secondary" and where the UE's usage setting is set to "Data only", when IMS Registration fails after one or more retries and a combined registration procedure is not automatically attempted, or in the case where the UE's voice setting is "IMS PS Voice Only" and the UE's usage setting is set to "Data only", then the UE is configured to notify the user (via the user interface or some other alert) that voice services are unavailable. In this case the user may choose to change the UE's usage setting to "Voice Centric" or "Data Centric". This immediately prompts the UE to attempt a combined registration procedure (in the case where the UE's voice setting is "IMS Voice Preferred, CS Voice Secondary"), which, if successful, would allow the UE to remain in EPS until voice services are required, and in that case to obtain voice services by means of CSFB. In the case where the UE's voice setting is "IMS PS Voice Only", the user may change the UE's usage setting to "Voice Centric" or "Data Centric" which would prompt the UE to reselect to another RAT that may support voice services.

Figure 7A:
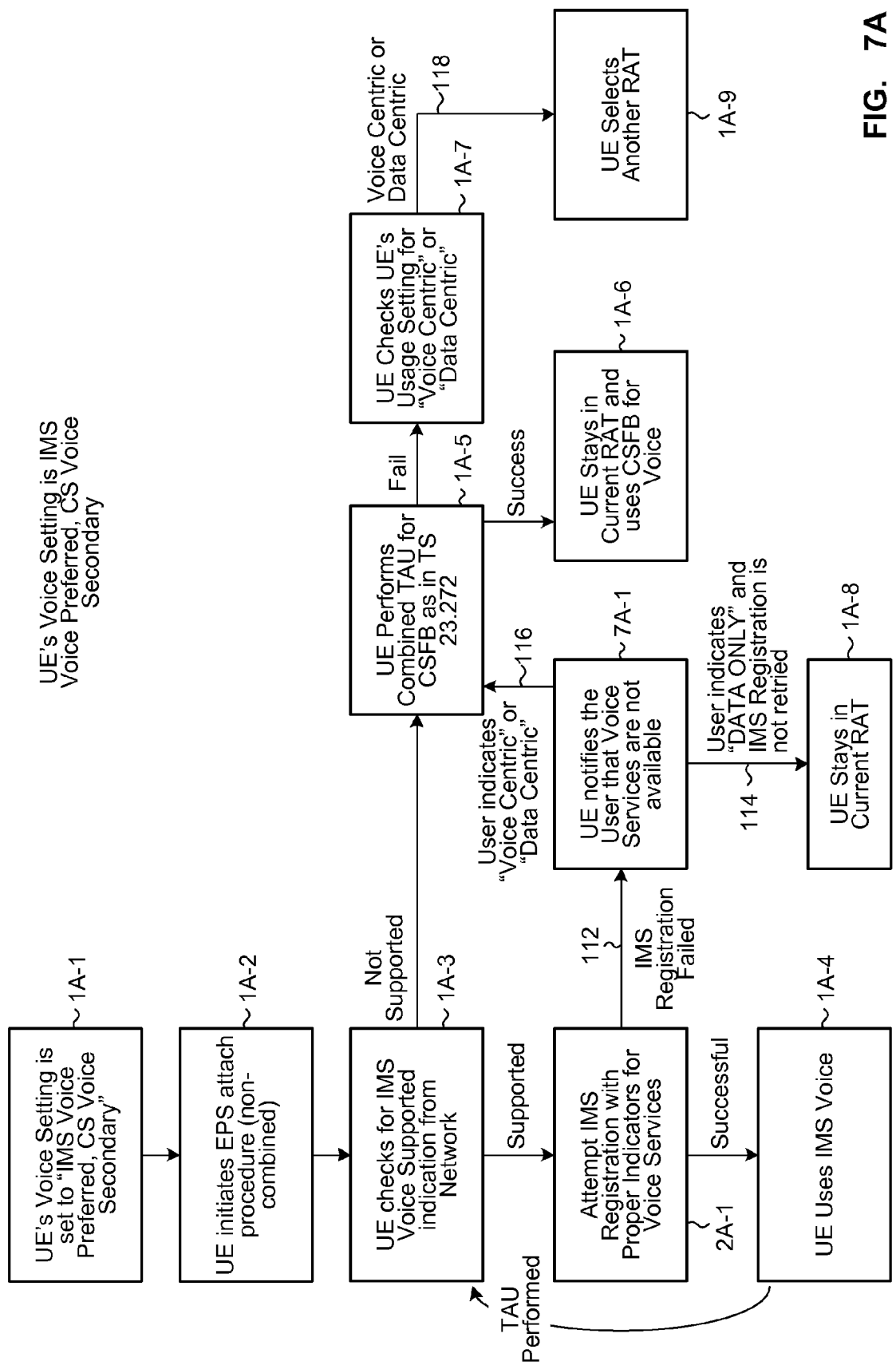

An example of this behavior is depicted in FIG. 7A. FIG. 7A differs from FIG. 2A in that:

following IMS registration failure (112), the UE notifies the user that Voice Services are not available in block 7A-1;

if the user indicates "Voice Centric" or "Data Centric" (116), then the method continues at Block 1A-5;

if the user indicates "Data only", then IMS registration is not retried (114) and then the method continues at block 1A-8;

block 1A-9 follows block 1A-7 in the case (118) the UE's usage setting is "Voice Centric" or "Data Centric".

Figure 7B:
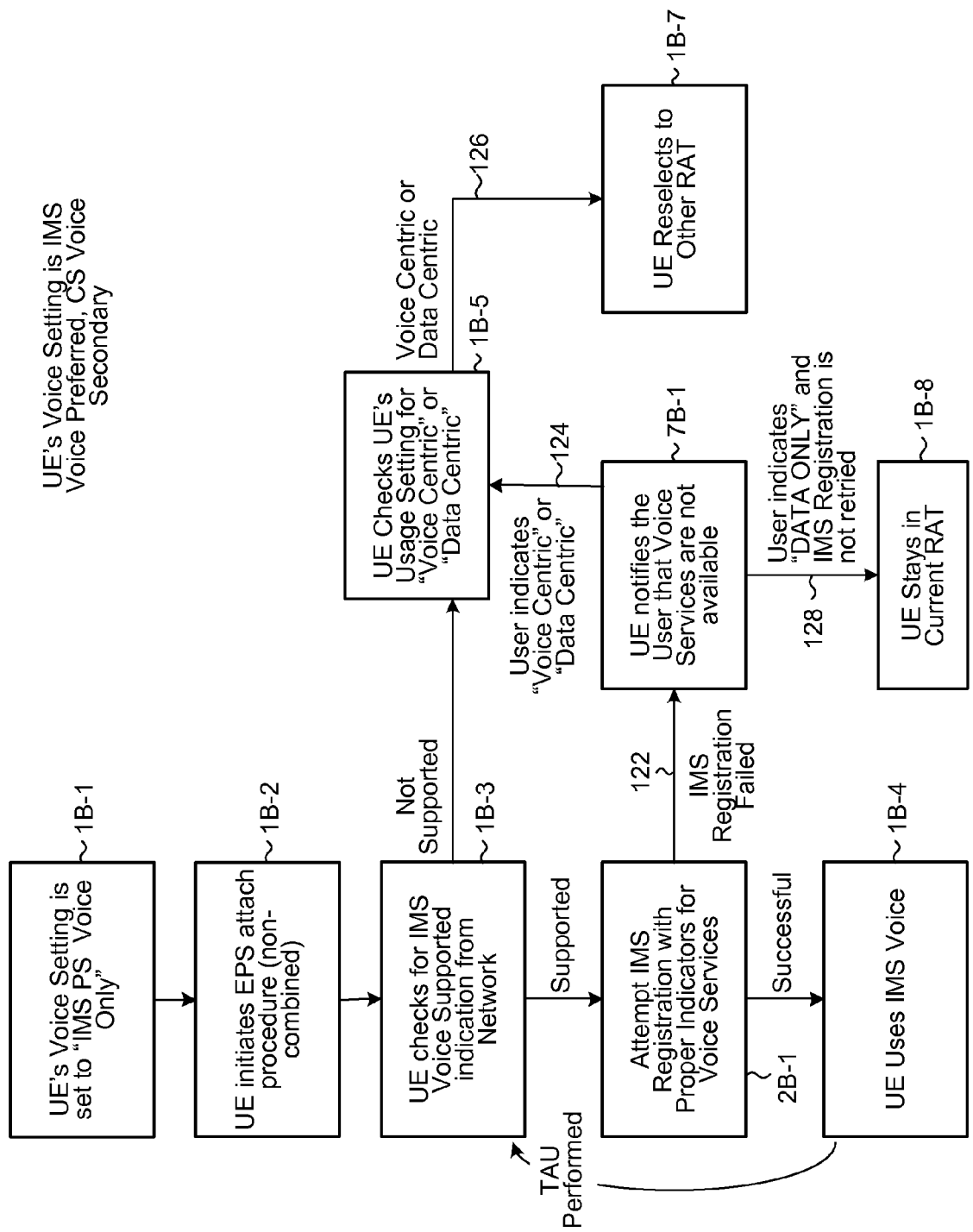

Another example of this behavior is depicted in FIG. 7B. FIG. 7B differs from FIG. 2B in that:

following IMS registration failure (122), the UE notifies the user that Voice Services are not available in block 7B-1;

if the user indicates "Voice Centric" or "Data Centric" (124), then the method continues at Block 1B-5;

if the user indicates "Data only", and IMS registration is not retried (128), then the method continues at block 1B-6;

block 1B-9 follows block 1B-5 in the case (126) the UE's usage setting is "Voice Centric" or "Data Centric".

Example 2E

As a follow-on to example 2D, in some implementations, the user is prompted that IMS registration (original or some number of attempts) has failed, and the user could alternatively request "Retry of IMS Registration for Voice", which could prompt the UE leave the UE's usage setting set to "Data Centric" or "Voice Centric" but to restart periodic attempts at IMS registration until successful or until a certain number of tries had been attempted and failed. Alternatively the user could indicate "Data Only" in which case the UE would leave the UE's usage setting set to "Data Centric" and the UE will not reattempt IMS registration (for the purpose of voice services).

Figure 7C:
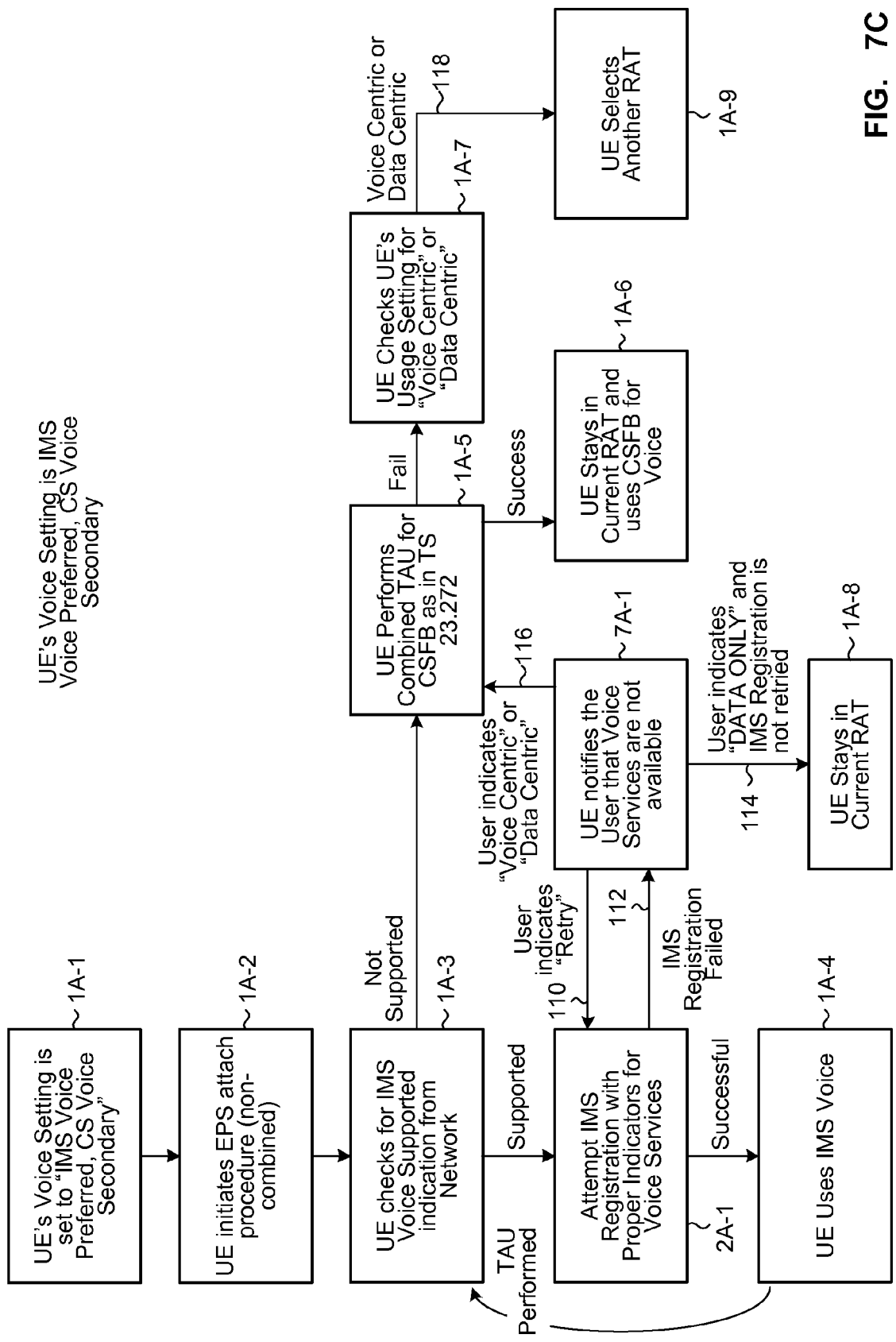

An example of this behavior is depicted in FIG. 7C. FIG. 7C differs from FIG. 7A in that:

following IMS registration failure (112), the UE notifies the user that Voice Services are not available in block 7A-1 and if the user indicates "RETRY" at 110, then the method continues at block 2A-1.

Figure 7D:
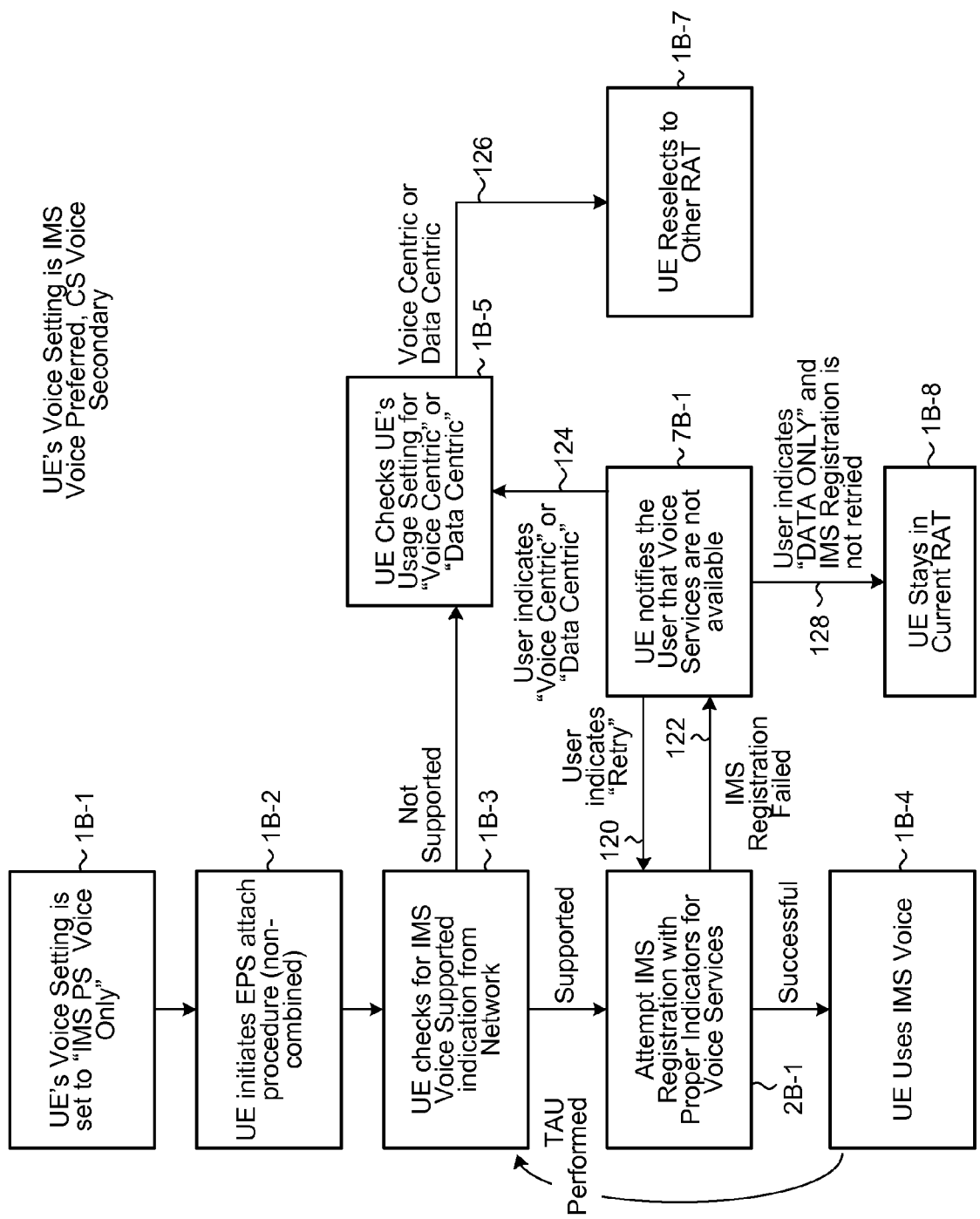

Another example of this behavior is depicted in FIG. 7D. FIG. 7D differs from FIG. 7C in that:

following IMS registration failure (122), the UE notifies the user that Voice Services are not available in block 7B-1, if the user indicates "RETRY" at 120, then the method continues at block 2A-1.

Example 3A

In some implementations, the UE is configured to recognize a situation where IMS registration has failed, and the UE's usage setting is "Voice Centric". The UE is configured to, upon recognizing this situation and regardless of whether the UE's voice setting is "IMS PS voice only" or "IMS Voice Preferred, CS Voice Secondary", trigger the AS to select/reselect to another RAT (the target RAT) in which voice services can be realized (e.g. GERAN/UTRAN).

Figure 8A:
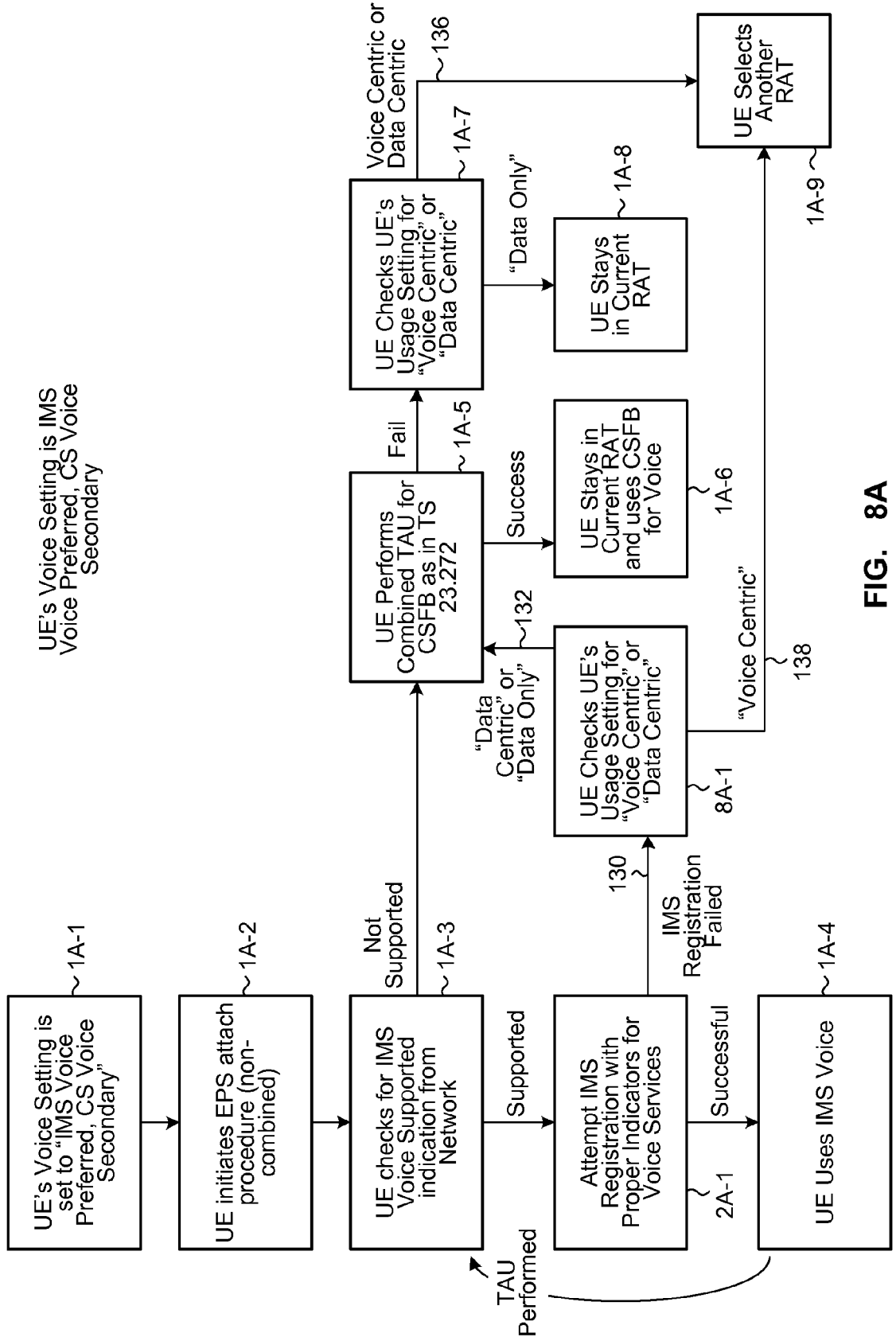

A first detailed example of this behavior is depicted in FIG. 8A. FIG. 8A differs from FIG. 2A as follows:

following IMS registration failure at 130, the UE checks the UE's usage setting for "Voice Centric" or "Data Centric" at block 8A-1;

If the setting is "Data Centric" or "Data Only" as indicated at 132, the method continues at block 1A-5;

If the setting is "Voice Centric" as indicated at 138, then the method continues at block 1A-9 with selection of another RAT;

Block 1A-8 follows block 1A-7 for the case the UE's usage setting is "Data only" (indicated at 134);

Block 1A-9 follows block 1A-7 for the case where the UE's usage setting is "Voice Centric" or "Data Centric" (indicated at 136).

Figure 8B:
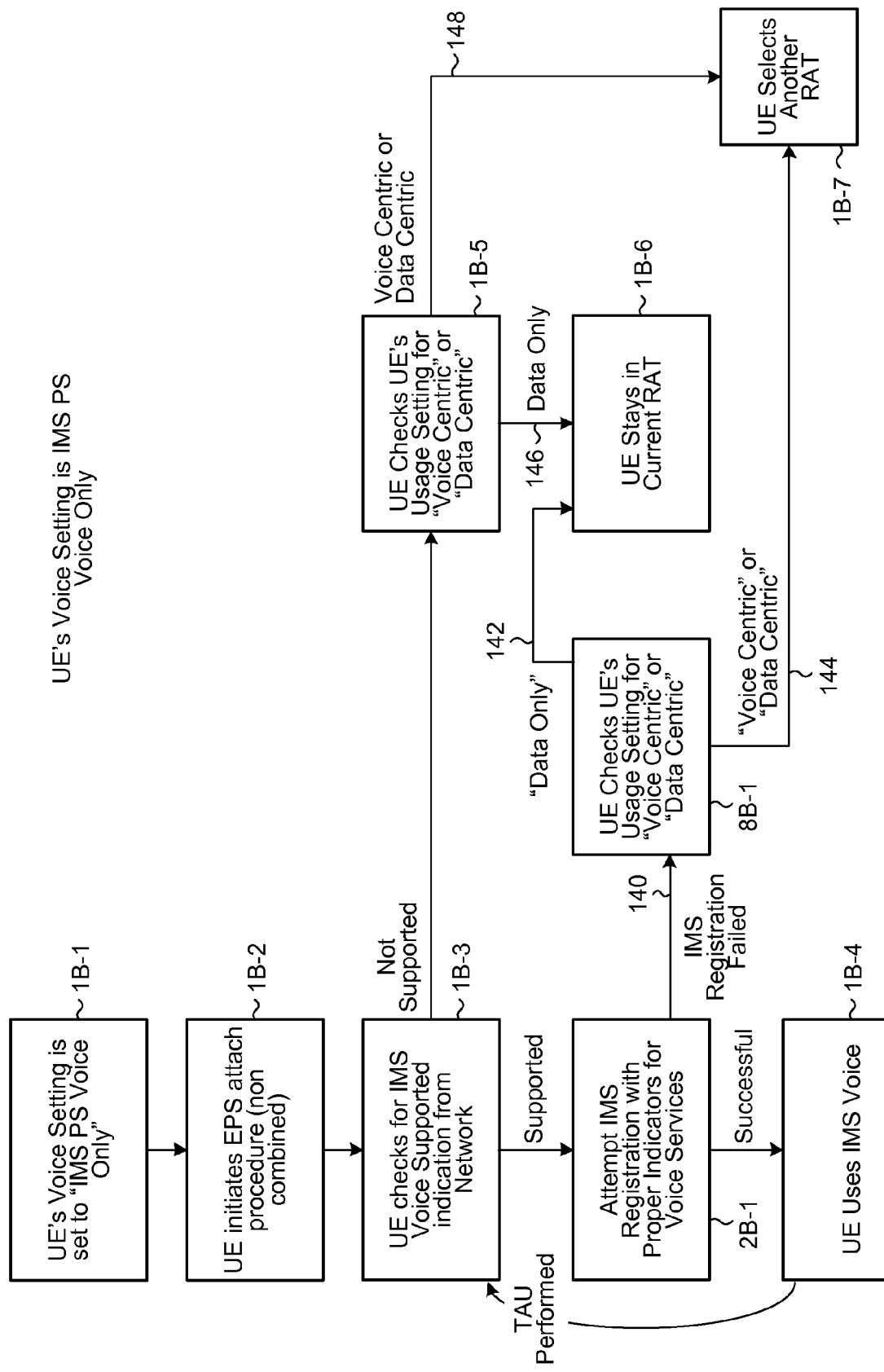

A second detailed example of this behavior is depicted in FIG. 8B. FIG. 8B differs from FIG. 2B as follows:

following IMS registration failure at 140, the UE checks the UE's usage setting for "Voice Centric" or "Data Centric" at block 8B-1;

If the setting is "Data Only" as indicated at 142, the method continues at block 1B-6;

If the setting is "Voice Centric" or "Data Centric" as indicated at 144, then the method continues at block 1B-7 with selection of another RAT;

Block 1B-6 follows block 1B-5 for the case where the UE's usage setting is "Data Only" (indicated at 146);

Block 1B-7 follows block 1B-5 for the case where the UE's usage setting is "Voice Centric" or "Data Centric" (indicated at 148).

Example 3B

In some implementations, the UE is configured to, as a follow on to RAT reselection as described with reference to example 3A above, retry IMS registration once it is in the target system if it learns that the target system can support IMS voice. If this subsequent attempt at IMS Registration in the target system fails, then in this case the UE may obtain voice services via CS in the target system.

Figure 9A:
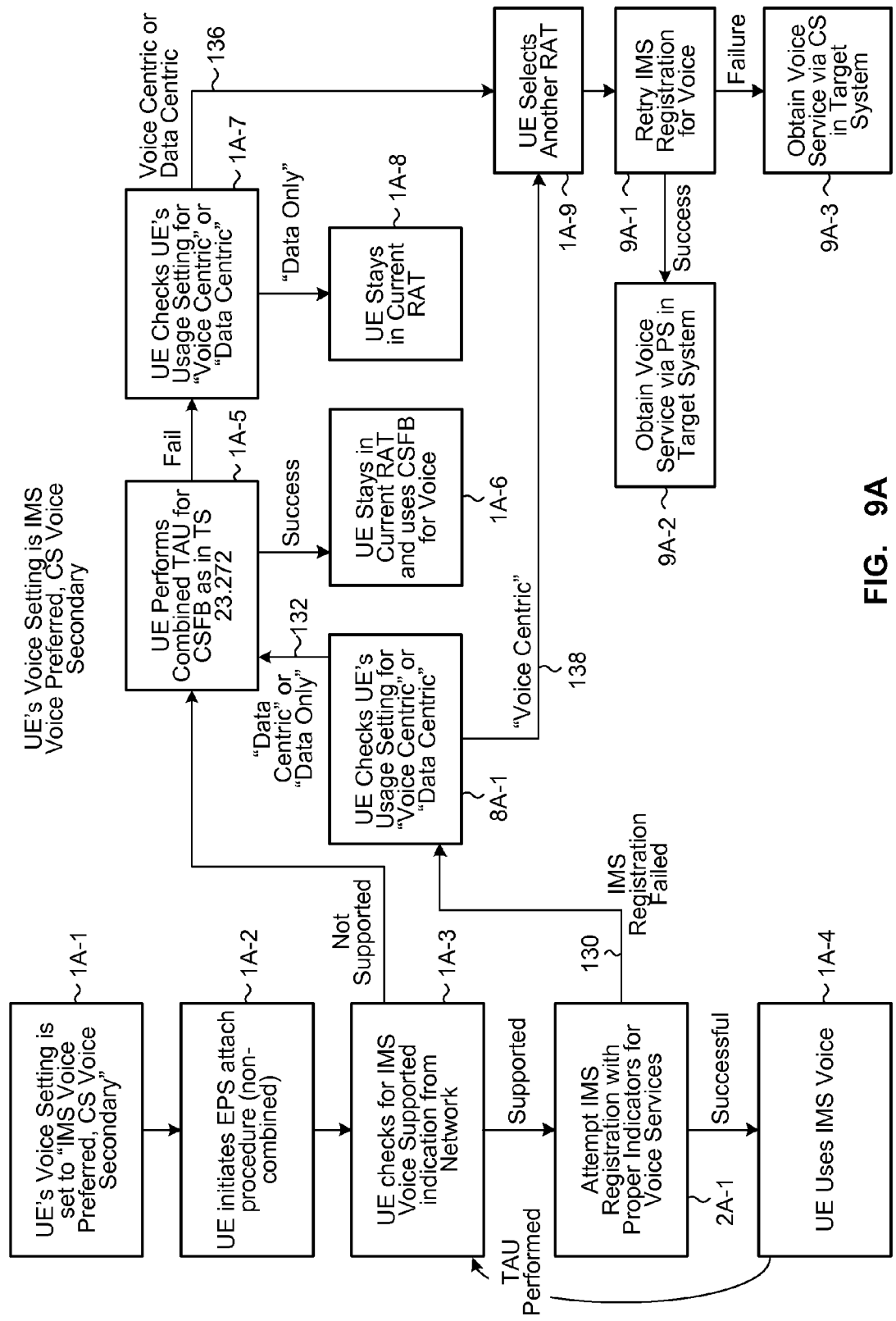

A first example of this behavior is depicted in FIG. 9A which is the same as FIG. 8A with the addition of blocks 9A-1, 9A-2 and 9A-3. Following block 1A-9, the UE retries IMS registration for voice if it learns that the target system can support IMS voice at block 9A-1. If there is success, then the UE obtains voice services via PS in the target system at block 9A-2. If there is failure, then the UE obtains voice services via CS in the target system at block 9A-3.

Figure 9B:
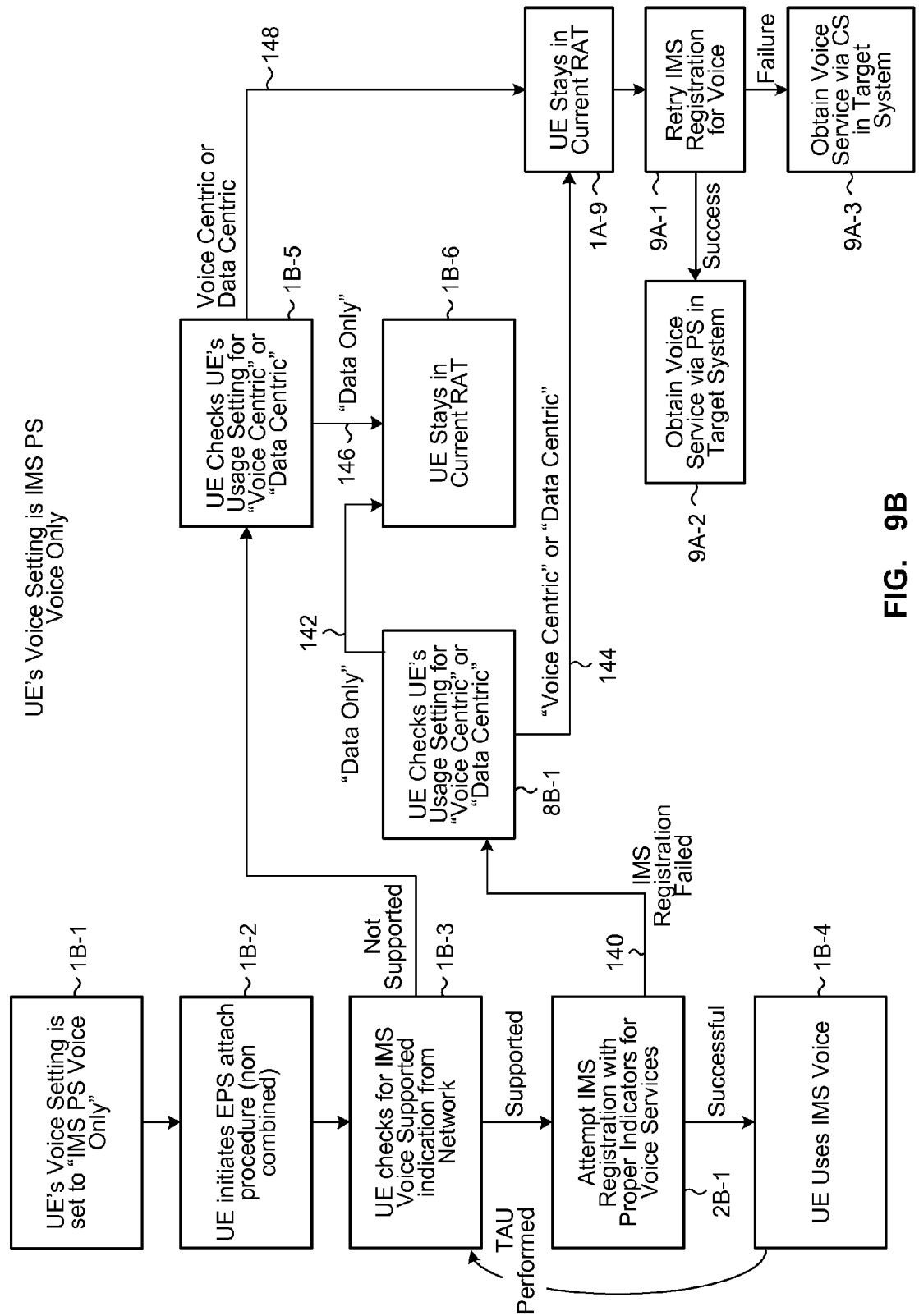

A second example of this behavior is depicted in FIG. 9B which is the same as FIG. 8B with the addition of blocks 9B-1, 9B-2 and 9B-3. Following block 1B-7, the UE retries IMS registration for voice if it learns that the target system can support IMS voice at block 9B-1. If there is success, then the UE obtains voice services via PS in the target system at block 9B-2. If there is failure, then the UE obtains voice services via CS in the target system at block 9B-3.

Third Problem: UE May be Constrained in an Inappropriate Rat

A third problem with the behavior specified in FIGS. 1A and 1B is that the UE may become constrained in an inappropriate RAT. More specifically, if the UE's usage setting in FIGS. 1A and 1B is set to "Data Centric", this can lead to that UE not getting voice services at all. If "Data Centric" in FIGS. 1A and 1B is taken to mean that the UE only wants data services (even if that precludes ANY voice service), i.e. "Data Only", then this is not a problem. In the case where "data centric" in FIGS. 1A and 1B is taken to mean "Data Centric" as defined above in this document, then this behavior is problematic.

Furthermore, if the UE stays in the current RAT and does not have access to voice services because the network VoIMS indication (in the registered tracking area, since this indication is per tracking area) did not indicate support, but due to mobility the UE enters a routing area of GERAN/UTRAN radio coverage or tracking area of E-UTRAN coverage where the network VoIMS indicator does indicate that IMS PS Voice is supported, then the UE needs to subsequently re-attempt the IMS registration for voice.

In another situation, if the UE's voice setting is "IMS PS Voice Only" or "IMS Voice Preferred, CS Voice Secondary", and the UE's usage setting is set to "Voice Centric" or "Data Centric", the UE may end up camping in GERAN/UTRAN and use CS voice services for voice even if voice services over IMS in LTE or GERAN/UTRAN may be become available due to the mobility of the UE. As the UE moves, it may move into the coverage area of a new E-UTRAN tracking area or a new GERAN/UTRAN routing area which does support IMS Voice, in which case there is a possibility that the UE could get IMS voice services over GERAN/UTRAN or over LTE, and for a "data centric" UE better PS service over LTE, if it were not constrained in GERAN/UTRAN.

Example 1

Figure 10A:
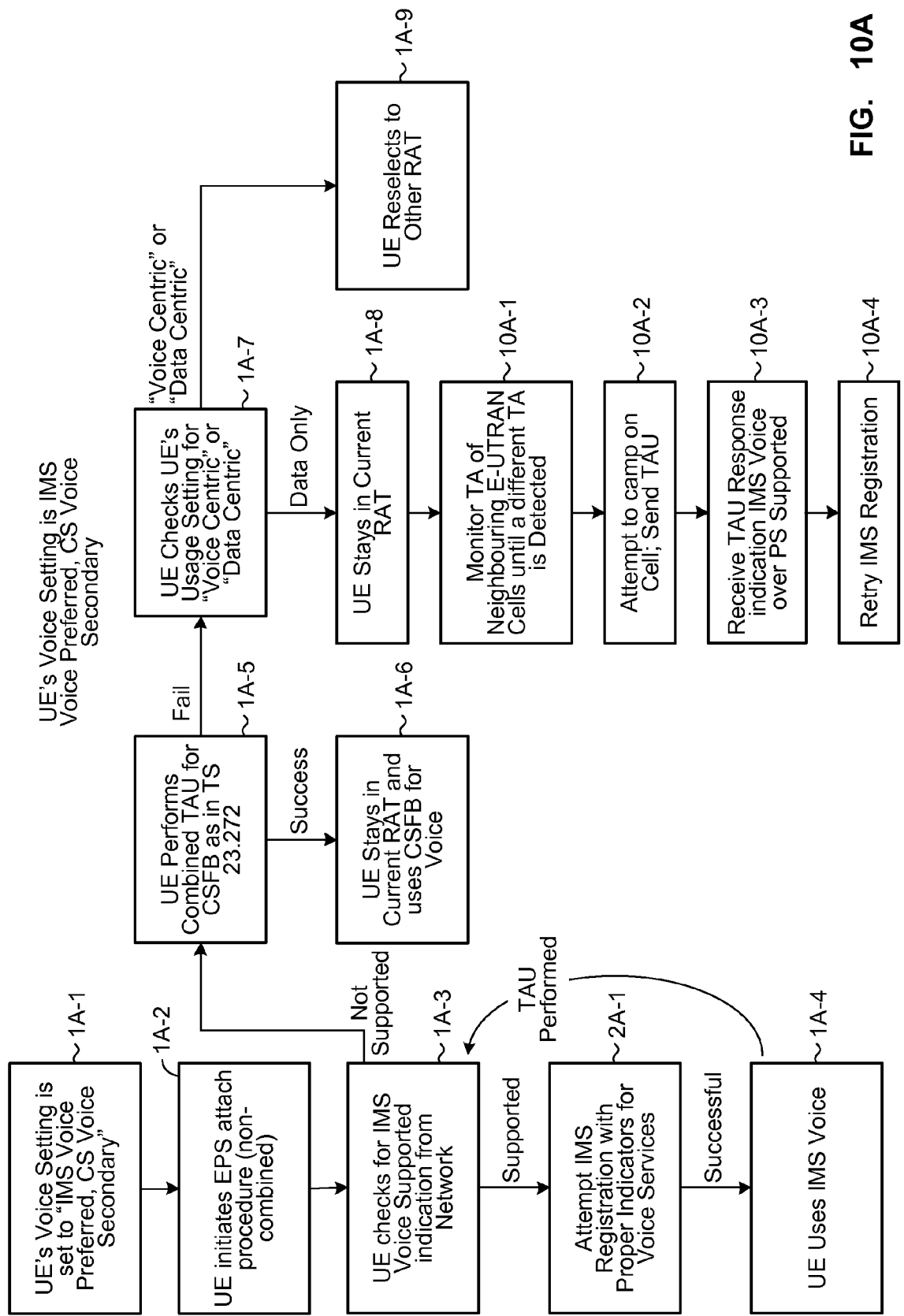

In some implementations, the UE is configured to recognize a situation in which the UE's usage setting is set to "Data Only", the UE's voice setting is "IMS PS Voice Only" or "IMS Voice Preferred, CS Voice Secondary" and in which when it tried to EPS attach, it learned that "IMS Voice over PS session not supported", such that the UE ends up camping in E-UTRAN with no access to voice services. The support of IMS Voice over PS session is per Tracking Area (TA). The UE is configured to then monitor the TA of neighboring E-UTRAN cells until a cell with a different TA/RA (or alternatively a cell with a TA outside the UE TAI List) is detected. Upon detecting such an LTE cell, the UE attempts to camp on this cell, and sends a Tracking Area Update to the network as part of this process. In response to this, the UE receives a Tracking Area Update response. The Tracking Area Update response includes the network VoIMS Indicator for this tracking area. If the indicator is "IMS Voice over PS session supported", then the UE retries the IMS registration with indicators requesting voice services. Follow on behavior may for example be in accordance with the implementations described above which deal with IMS registration failure An example of this behavior is depicted in FIG. 10A. When the UE arrives at block 1A-8, the scenario described above may occur. The method continues in block 10A-1 with the UE monitoring the TA of neighboring E-UTRAN cells until a cell with a different TA (or alternatively a cell with a TA outside the UE TAI List) is detected. In block 10A-2, upon detecting such a cell, the UE attempts to camp on this cell, and sends a Tracking Area Update to the network as part of this process. In response to this, the UE receives a Tracking Area Update response. The Tracking Area Update response includes the network VoIMS Indicator for this tracking area. If the indicator is "IMS Voice over PS session supported" (block 10A-3), then the UE retries the IMS registration with indicators requesting voice services in block 10A-4. Follow on behavior may for example be in accordance with the implementations described above which deal with IMS registration failure. For a UE voice setting of IMS PS voice only, steps 10A-1, 10A-2, 10A-3 and 10A-4 would follow block 1B-6 of FIG. 2B.

Example 2

In some implementations, the UE is configured to recognize a situation in which the UE's usage setting is set to "Voice Centric" or "Data Centric", the UE's voice setting is "IMS PS Voice Only" or "IMS Voice Preferred, CS Voice Secondary", and when it tried to EPS attach, it receives the VoIMS Indicator and learns that "IMS Voice over PS session not supported", such that it ends up camping in GERAN/UTRAN with voice service but suboptimal data services. In this case, when the UE is in idle mode, the UE is configured to attempt (once, or multiple times, for example at regular intervals, or based on a timer) to reselect to a suitable found E-UTRAN cell. As described above, this process triggers a regular tracking area update when the UE's voice setting is "IMS PS Voice Only" or a combined tracking area update if the UE's voice setting is "IMS Voice Preferred, CS Voice Secondary". If the VoIMS Indicator obtained during the TAU or combined TA/LA Update Procedure indicates that IMS voice is supported, then the UE proceeds to try IMS registration with indicators requesting voice services. Follow on behavior may for example be in accordance with the implementations described above which deal with IMS registration failure.

Figure 10B:
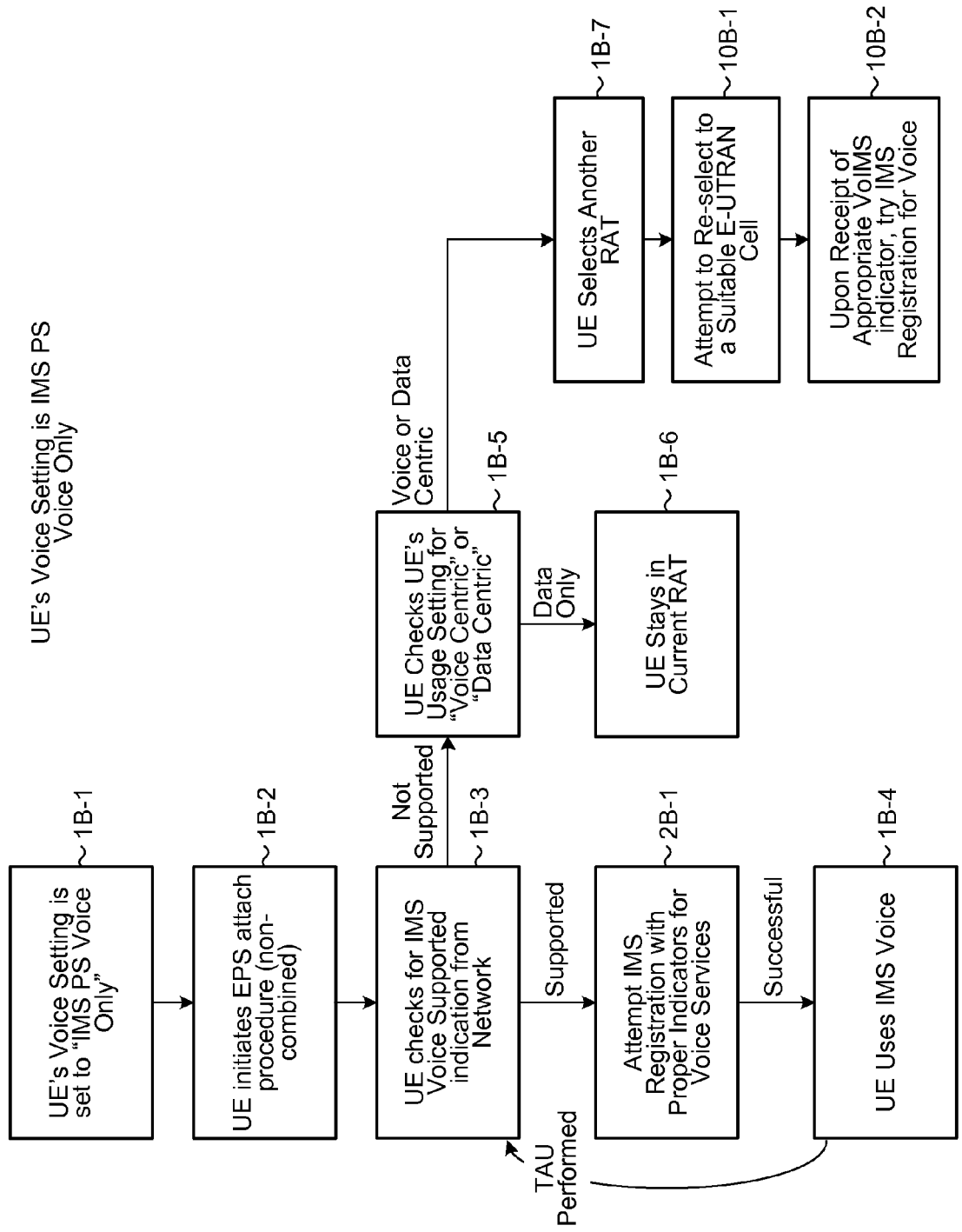

An example of this behaviour for UE Voice Setting of "IMS PS Voice Only" is depicted in FIG. 10B. When the UE arrives at block 1B-7, the scenario described above may occur. In this case, when the UE is in idle mode, the UE is configured to attempt (once, or multiple times, for example at regular intervals, or based on a timer) to reselect to a suitable found E-UTRAN cell at block 10B-1. This process triggers a regular tracking area update when the UE's voice setting is "IMS PS Voice Only" or a combined tracking area update if the UE's voice setting is "IMS Voice Preferred, CS Voice Secondary". If the VoIMS Indicator obtained during the TAU or combined TA/LA Update Procedure indicates that IMS voice is supported, then the UE proceeds to try IMS registration with indicators requesting voice services at 10B-2. For a UE Voice Setting of "IMS Voice Preferred, CS Voice Secondary", steps 10B-1 and 10B-2 would follow block 1A-9 of FIG. 2A.

Figure 10C:
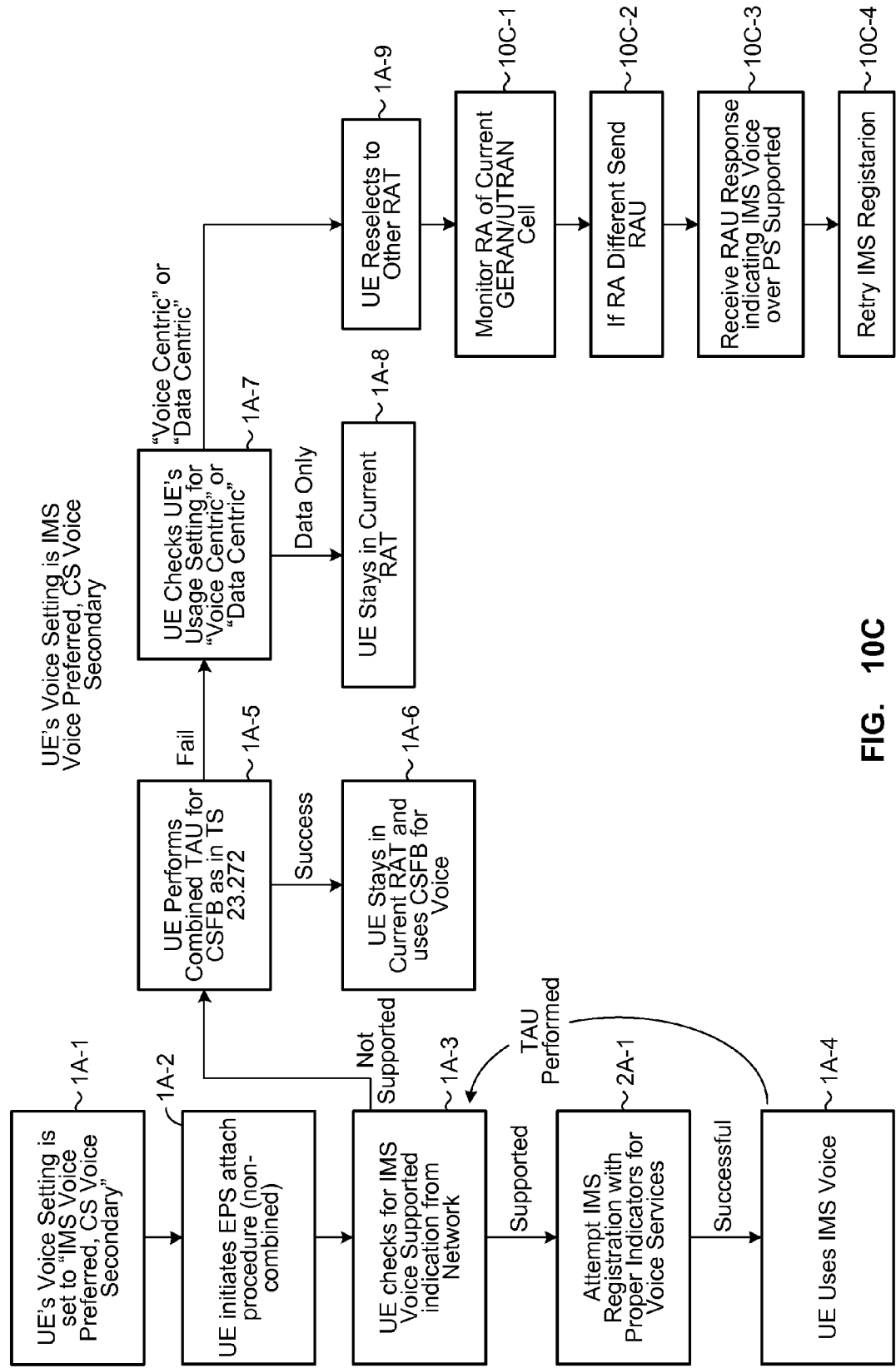

[Another example is depicted in FIG. 10C. When the UE arrives at block 1A-9, the scenario described above may occur. The method continues in block 10C-1 where the UE determines that the RA of the current cell is different from the previous RA. In block 10C-2, upon detecting such a cell, the UE sends a Routing Area Update to the network as part of this process. In response to this, the UE receives a Routing Area Update response. The Routing Area Update response includes the network VoIMS Indicator for this routing area. If the indicator is "IMS Voice over PS session supported" (block 10C-3), then the UE retries the IMS registration with indicators requesting voice services in block 10C-4. Follow on behavior may for example be in accordance with the implementations described above which deal with IMS registration failure. For a UE voice setting of IMS PS voice only, steps 10C-1, 10C-2, 10C-3 and 10C-4 would follow block 1B-6 of FIG. 2B.

In some implementations, a combined routing area update procedure may be initiated by a GPRS MS operating in MS operation modes A or B, when the MS is in state GMM-REGISTERED and MM-IDLE, when the network operates in network operation mode I, and when, in Iu mode, the UE receives an indication from the upper layers that the SIP registration to the IP Multimedia subsystem has failed and the UE's usage setting is "Voice Centric."

One aspect of the possible examples described for problem 3 is that the UE obtains the VoIMS indicator for the TA or RA by performing a NAS registration procedure such as a Tracking Area Update or Routing Area Update. This registration procedure requires signalling between the UE and the network. For example, a NAS registration response message may be a response to an EPS attach procedure, a TRACKING AREA UPDATE response, a ROUTING AREA UPDATE response, an ATTACH ACCEPT response, or a TRACKING AREA UPDATE ACCEPT response. In some implementations, the network is configured to broadcast the VoIMS indicator as part of the broadcast system information sent by every cell. As an example of how this VoIMS indicator could be used can be considered as a minor variation of the implementation described in FIG. 10B. Instead of the UE attempting to reselect to an E-UTRAN cell at regular intervals and perform Tracking Area Update to obtain the VoIMS indicator (as shown in Block 10B-1 of FIG. 10B), the UE could attempt to read broadcast system information of an E-UTRAN cell at regular intervals to obtain the VoIMS indicator. If the VoIMS Indicator obtained broadcast system information indicates that IMS voice is supported, then the UE proceeds to try IMS registration with indicators requesting voice services at 10B-2

Fourth Problem: Change Back to "Voice Centric" or "Data Centric" after the UE's Usage Setting has been Changed to "Data Only"

A fourth problem with the behaviour specified in the above-referenced FIGS. 1A and 1B is that in some situations it is desirable for the UE's Usage Setting to be changed. For example, if the UE is downloading a large volume of data then it may be desirable for the UE's Usage Setting to be "Data only" so that the UE uses E-UTRAN even if voice services are not available on E-UTRAN. When the download of the large volume of data is complete then it may be desirable for the UE's Usage Setting to be "Voice Centric" or "Data Centric" again in order to ensure that voice is available, even it is means that another RAT is selected. A particular problem is that the user may set the UE's Usage Setting to be "data only" but then forget to revert the setting back to "Voice Centric" or "Data Centric" at a later stage.

Example 1

More specifically, if the UE's usage setting in the above-referenced FIG. 1A or 1B is set to "Data Centric", based on user preferences or based on the requirements of the applications running in the UE, the UE usage setting may be modified to "Data Only" to give priority to data services and therefore have the UE select the best RAT for data services (i.e. E-UTRAN). However, it is desirable that the UE Usage Setting can be modified at a later time to the original value (i.e. "Voice Centric" or "Data Centric"). As an example, the UE Usage Setting may be changed by the user at a later time. In another example, an application running in the UE and requires the best PS service available even when the UE is "Voice Centric" or "Data Centric", and based on this the application or the user changes the UE Usage Setting to "Data Only". However, once the application has terminated, the application or the UE change the UE Usage Setting back to the original value, that is "Voice Centric" or "Data Centric".

In such scenarios, once the UE Usage Setting is changed to "Data Only" the UE will end up selecting the RAT based on the behavior described in the implementations above for a "Data Only" UE. However, once the UE Usage Setting is modified back to the original value, the UE should try to connect to the appropriate RAT and attempt to access voice services based on the availability of IMS and the UE Voice Setting of the UE. With the current behavior defined for the UE, however, the UE would not attempt to reselect an appropriate RAT nor to register for IMS when IMS is available.

In certain scenarios, the UE Usage Setting is modified by the user or an application (or set of applications) running in the UE from "Data Centric" or "voice Centric" to "Data Only" to allow for the best PS service for applications running in the UE. At a later time, the UE Usage Setting is reverted to the original setting based a set of possible triggering conditions. As a result, the UE based on the UE Voice Settings performs one or more of the procedures described in the implementations above to discover whether IMS voice is available, register with IMS and select the appropriate RAT.

With reference to FIG. 11A, in an implementation, an application (or set of applications) running in the UE modifies UE Usage Setting at block 11A-1. In block 11A-2, the application(s) that modified the UE Usage Setting terminates (or alternatively, the application(s) need for "data only" operation comes to an end) and causes the UE Usage setting to be restored to the original value. If the UE Voice Setting is "IMS Voice Preferred, CS Voice secondary", the UE will behave as in the implementations above for an UE whose UE Voice Setting is "IMS Voice Preferred, CS Voice secondary". If the UE Voice Setting is "IMS PS Voice only", the UE will behave as in the implementations above for UE whose UE Voice Setting is "IMS PS Voice only". This is generally indicated at block 11A-3.

With reference to FIG. 11B, in an implementation, the user requests a mobile originated voice call in block 11B-1. On request of the mobile originated voice call the UE reverts to "Voice Centric" or "Data Centric" in order to be able to establish the voice call in block 11B-2. The UE then behaves as in the implementation of FIG. 11A depending on the UE Voice Setting. This involves reverting to the original UE Usage Setting in block 11B-3, and then continuing with one of the previously described methods (11B-4).

With reference to FIG. 11C, in an implementation, the UE receives an email with a voicemail as an attachment in block 11C-1. On reception of this email the UE reverts to "Voice Centric" or "Data Centric" in order to be able to return the missed call in block 11C-2. The UE then behaves as in the implementation of FIG. 11A depending on the UE Voice Setting. This involves reverting to the original UE Usage Setting in block 11C-3, and then continuing with one of the previously described methods (11C-4).

With reference to FIG. 11D, in an implementation, the user receives an SMS indication that a voice mail is waiting or that a call has been missed in block 11D-1. On reception of this SMS the UE reverts to "Voice Centric" or "Data Centric" in order to be able to establish a voice call to retrieve the voice mail and/or return the missed call. The UE then behaves as in the implementation of FIG. 11A depending on the UE Voice Setting. This involves reverting to the original UE Usage Setting in block 11D-3, and then continuing with one of the previously described methods (11D-4).

With reference to FIG. 11E, in an implementation, an incoming IMS voice call was received by the IMS infrastructure but the voice call could not be delivered to the UE because the IMS Registration for IMS Voice had not been successful, and the UE receives notification from IMS of such missed call in block 11E-1. On reception of this notification the UE reverts to "Voice Centric" or "Data Centric" in order to be able to return the missed voice call at block 11E-2. The UE then behaves as in the implementation of FIG. 11A depending on the UE Voice Setting. This involves reverting to the original UE Usage Setting in block 11E-3, and then continuing with one of the previously described methods (11E-4).

In all the implementations above the restoration can be achieved as an example by storing the original UE Usage Setting value when it is modified by the application or the user and retrieving the value.

Another Mobile Device

Figure 12:
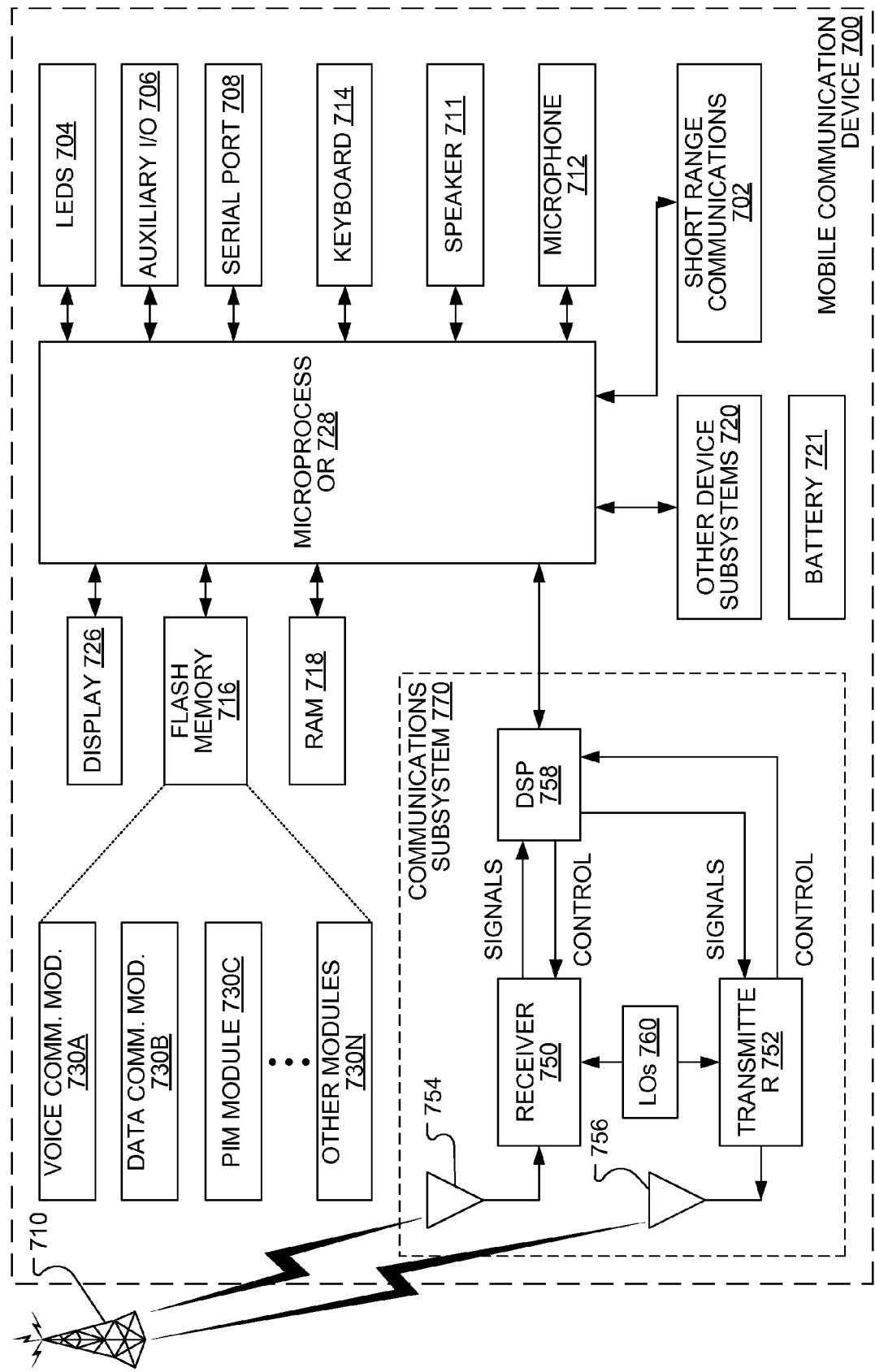
FIG. 12 is a block diagram of a mobile communication device that may implement UE related methods described herein.

Referring now to FIG. 12, shown is a block diagram of a mobile communication device 700 that may implement UE related methods described herein. It is to be understood that the mobile device 700 is shown with very specific details for example purposes only.

A processing device (a microprocessor 728) is shown schematically as coupled between a keyboard 714 and a display 726. The microprocessor 728 controls operation of the display 726, as well as overall operation of the mobile device 700, in response to actuation of keys on the keyboard 714 by a user.

The mobile device 700 has a housing that may be elongated vertically, or may take on other sizes and shapes (including clamshell housing structures). The keyboard 714 may include a mode selection key, or other hardware or software for switching between text entry and telephony entry.

In addition to the microprocessor 728, other parts of the mobile device 700 are shown schematically. These include: a communications subsystem 770; a short-range communications subsystem 702; the keyboard 714 and the display 726, along with other input/output devices including a set of LEDS 704, a set of auxiliary I/O devices 706, a serial port 708, a speaker 711 and a microphone 712; as well as memory devices including a flash memory 716 and a Random Access Memory (RAM) 718; and various other device subsystems 720. The mobile device 700 may have a battery 721 to power the active elements of the mobile device 700. The mobile device 700 is in some implementations a two-way radio frequency (RF) communication device having voice and data communication capabilities. In addition, the mobile device 700 in some implementations has the capability to communicate with other computer systems via the Internet.

Operating system software executed by the microprocessor 728 is in some implementations stored in a persistent store, such as the flash memory 716, but may be stored in other types of memory devices, such as a read only memory (ROM) or similar storage element. In addition, system software, specific device applications, or parts thereof, may be temporarily loaded into a volatile store, such as the RAM 718. In some implementations, one or more parameters representative of unevenness in the signal constellation are stored in the non-volatile memory or in a volatile store. Communication signals received by the mobile device 700 may also be stored to the RAM 718.

The microprocessor 728, in addition to its operating system functions, enables execution of software applications on the mobile device 700. A predetermined set of software applications that control basic device operations, such as a voice communications module 730A and a data communications module 730B, may be installed on the mobile device 700 during manufacture. In addition, a personal information manager (PIM) application module 730C may also be installed on the mobile device 700 during manufacture. The PIM application is in some implementations capable of organizing and managing data items, such as e-mail, calendar events, voice mails, appointments, and task items. The PIM application is also in some implementations capable of sending and receiving data items via a wireless network 710. In some implementations, the data items managed by the PIM application are seamlessly integrated, synchronized and updated via the wireless network 710 with the device user's corresponding data items stored or associated with a host computer system. As well, additional software modules, illustrated as other software module 730N, may be installed during manufacture.

Communication functions, including data and voice communications, are performed through the communication subsystem 770, and possibly through the short-range communications subsystem 702. The communication subsystem 770 includes a receiver 750, a transmitter 752 and one or more antennas, illustrated as a receive antenna 754 and a transmit antenna 756. In addition, the communication subsystem 770 also includes a processing module, such as a digital signal processor (DSP) 758, and local oscillators (LOs) 760. The specific design and implementation of the communication subsystem 770 is dependent upon the communication network in which the mobile device 700 is intended to operate. For example, the communication subsystem 770 of the mobile device 700 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Other types of data and voice networks, both separate and integrated, may also be utilized with the mobile device 700. The particular devices under consideration here are multi-mode mobile devices, and as such they include hardware and/or software for implementing at least two RATs. More specifically, in a particular example, there would be a respective communication subsystem 770 for each RAT implemented by the device.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile device 700 may send and receive communication signals over the communication network 710. Signals received from the communication network 710 by the receive antenna 754 are routed to the receiver 750, which provides for signal amplification, frequency down conversion, filtering, channel selection, etc., and may also provide analog to digital conversion. Analog-to-digital conversion of the received signal allows the DSP 758 to perform more complex communication functions, such as demodulation and decoding. In a similar manner, signals to be transmitted to the network 710 are processed (e.g., modulated and encoded) by the DSP 758 and are then provided to the transmitter 752 for digital to analog conversion, frequency up conversion, filtering, amplification and transmission to the communication network 710 (or networks) via the transmit antenna 756.

In addition to processing communication signals, the DSP 758 provides for control of the receiver 750 and the transmitter 752. For example, gains applied to communication signals in the receiver 750 and the transmitter 752 may be adaptively controlled through automatic gain control algorithms implemented in the DSP 758.

In a data communication mode, a received signal, such as a text message or web page download, is processed by the communication subsystem 770 and is input to the microprocessor 728. The received signal is then further processed by the microprocessor 728 for an output to the display 726, or alternatively to some other auxiliary I/O devices 706. A device user may also compose data items, such as e-mail messages, using the keyboard 714 and/or some other auxiliary I/O device 706, such as a touchpad, a rocker switch, a thumb-wheel, or some other type of input device. The composed data items may then be transmitted over the communication network 710 via the communication subsystem 770.

In a voice communication mode, overall operation of the device is substantially similar to the data communication mode, except that received signals are output to a speaker 711, and signals for transmission are generated by a microphone 712. Alternative voice or audio I/O subsystems, such as a voice message recording subsystem, may also be implemented on the mobile device 700. In addition, the display 716 may also be utilized in voice communication mode, for example, to display the identity of a calling party, the duration of a voice call, or other voice call related information.

The short-range communications subsystem 702 enables communication between the mobile device 700 and other proximate systems or devices, which need not necessarily be similar devices. For example, the short-range communications subsystem may include an infrared device and associated circuits and components, or a Bluetooth™ communication module to provide for communication with similarly-enabled systems and devices.

Numerous modifications and variations of the present invention are possible in light of the above teachings. It is therefore to be understood that within the scope of the appended claims, the invention may be practiced otherwise than as specifically described herein.

What is claimed is:

1. A method in a UE in an Evolved Packet System (EPS), the method comprising:
  receiving, at the UE, a first Non Access Stratum (NAS) protocol response message with a network provided Voice over IP Multimedia (IM) Core Network (CN) Subsystem (VoIMS) indicator, wherein the UE has a voice services indicator related to a UE usage setting, the UE usage setting being one of a preference of the UE for voice service or a preference of the UE for data service, wherein the NAS protocol response message is an Attach Accept message; and
  responsive to the voice services indicator related to the UE usage setting and the network provided VoIMS indicator, the UE disabling evolved universal mobile telecommunications system terrestrial radio access (E-UTRAN) cell reselection.

2. The method of claim 1, further comprising causing the UE to enable cell reselection to E-UTRAN cells based on the voice services indicator related to the UE usage setting.

3. The method of claim 1, wherein the first Non Access Stratum (NAS) protocol response message is a combined NAS response message, the combined NAS response message including an indication of failure, wherein disabling the E-UTRAN cell reselection further comprises causing the UE to disable E-UTRAN cell reselection.

4. The method of claim 1, wherein disabling the E-UTRAN cell reselection further comprises causing the UE to disable E-UTRAN cell reselection subsequent to the UE's usage setting changing.

5. The method of claim 1, wherein disabling the E-UTRAN cell reselection further comprises allowing the UE to remain in EPS until access to voice services are required and causing the UE to disable E-UTRAN cell reselection subsequent to the UE's usage setting changing in response to an event requiring access to voice services.

6. The method of claim 1, wherein disabling the E-UTRAN cell reselection further comprises causing the UE to disable E-UTRAN cell reselection subsequent to an IMS registration failing.

7. The method of claim 1, wherein disabling the E-UTRAN cell reselection further comprises retrying IMS registration subject to a further voice services indicator subsequent to causing the UE to disable E-UTRAN cell reselection.

8. The method of claim 1, wherein disabling the E-UTRAN cell reselection further comprises monitoring the tracking area (TA) of neighboring E-UTRAN cells until a cell with at least one of a different TA/routing area (RA) or a TA outside the UE tracking area identity list is detected.

9. The method of claim 1, wherein the network provided VoIMS indicator comprise a value of "IMS voice over PS sessions are not supported".

10. The method of claim 1, wherein the network provided VoIMS indicator comprise a value of "IMS voice over PS sessions are supported".

11. The method of claim 1, wherein the network provided VoIMS indicator comprise a value of "UE is not available for voice calls in the IMS".

12. The method of claim 1, wherein the network provided VoIMS indicator comprises a value of "UE is available for voice calls in the IMS".

13. A non-transitory computer readable medium storing instructions that, when executed, cause a UE in an Evolved Packet System (EPS) to:
    receive, at the UE, a first Non Access Stratum (NAS) protocol response message with a network provided Voice over IP Multimedia (IM) Core Network (CN) Subsystem (VoIMS) indicator, wherein the UE has a voice services indicator related to a UE usage setting, the UE usage setting being one of a preference of the UE for voice service or a preference of the UE for data service, wherein the NAS protocol response message is an Attach Accept message; and
    responsive to the voice services indicator related to the UE usage setting and the network provided VoIMS indicator, the UE to disable evolved universal mobile telecommunications system terrestrial radio access (E-UTRAN) cell reselection.

14. The non-transitory computer readable medium of claim 13, wherein the instructions further cause the UE to enable cell reselection to E-UTRAN cells based on the voice services indicator related to the UE usage setting.

15. The non-transitory computer readable medium of claim 13, wherein the first Non Access Stratum (NAS) protocol response message is a combined NAS response message, the combined NAS response message including an indication of failure, wherein disabling the E-UTRAN cell reselection further comprises causing the UE to disable E-UTRAN cell reselection.

16. The non-transitory computer readable medium of claim 13, wherein disabling the E-UTRAN cell reselection further comprises causing the UE to disable E-UTRAN cell reselection subsequent to the UE's usage setting changing.

17. The non-transitory computer readable medium of claim 13, wherein disabling the E-UTRAN cell reselection further comprises allowing the UE to remain in EPS until access to voice services are required and causing the UE to disable E-UTRAN cell reselection subsequent to the UE's usage setting changing in response to an event requiring access to voice services.

18. The non-transitory computer readable medium of claim 13, wherein disabling the E-UTRAN cell reselection further comprises causing the UE to disable E-UTRAN cell reselection subsequent to an IMS registration failing.

19. The non-transitory computer readable medium of claim 13, wherein disabling the E-UTRAN cell reselection further comprises retrying IMS registration subject to a further voice services indicator, subsequent to causing the UE to disable E-UTRAN cell reselection.

20. The non-transitory computer readable medium of claim 13, wherein disabling the E-UTRAN cell reselection further comprises monitoring the tracking area (TA) of neighboring E-UTRAN cells until a cell with at least one of a different TA/routing area (RA) or a TA outside the UE tracking area identity list is detected.

21. The non-transitory computer readable medium of claim 13, wherein the network provided VoIMS indicator comprise a value of "IMS voice over PS sessions are not supported".

22. The non-transitory computer readable medium of claim 13, wherein the network provided VoIMS indicator comprise a value of "IMS voice over PS sessions are supported".

23. The non-transitory computer readable medium of claim 13, wherein the network provided VoIMS indicator comprise a value of "UE is not available for voice calls in the IMS".

24. The non-transitory computer readable medium of claim 13, wherein the network provided VoIMS indicator comprises a value of "UE is available for voice calls in the IMS".

* * * * *